(12) United States Patent
Yoneda

(10) Patent No.: US 12,709,115 B2
(45) Date of Patent: Aug. 18, 2026

(54) HUB ASSEMBLY FOR HUMAN POWERED VEHICLE

(71) Applicant: Shimano Inc., Sakai (JP)

(72) Inventor: Yuuya Yoneda, Sakai (JP)

(73) Assignee: Shimano Inc., Osaka (JP)

( * ) Notice: Subject to any disclaimer, the term of this patent is extended or adjusted under 35 U.S.C. 154(b) by 711 days.

(21) Appl. No.: 18/136,037

(22) Filed: Apr. 18, 2023

(65) Prior Publication Data

US 2024/0351372 A1 Oct. 24, 2024

(51) Int. Cl.
*B60B 27/02* (2006.01)
*B60B 27/00* (2006.01)
*B62M 6/60* (2010.01)

(52) U.S. Cl.
CPC ........ *B60B 27/023* (2013.01); *B60B 27/0047* (2013.01); *B62M 6/60* (2013.01)

(58) Field of Classification Search
CPC ...... B60B 27/023; B60B 35/08; B62J 45/423; B62J 11/19; B62J 43/20; B62J 43/30
See application file for complete search history.

(56) References Cited

U.S. PATENT DOCUMENTS 7,537,291 B2 5/2009 Hara
7,648,211 B2 1/2010 Watarai
7,731,214 B2 6/2010 Laird
2008/0284127 A1 11/2008 Watarai
2022/0194509 A1 6/2022 Navarro Baeza

FOREIGN PATENT DOCUMENTS

CN 102483095 A * 5/2012 ......... B60B 27/0073
CN 205652274 U 10/2016
DE 20 2012 003 143 U1 6/2012
DE 10 2018 126 435 A1 5/2019
JP 2018-100061 A 6/2018
JP 6853161 B2 3/2021
WO 2018/199761 A1 11/2018

* cited by examiner

*Primary Examiner* — S. Joseph Morano
*Assistant Examiner* — Alex Palmer

(57) ABSTRACT

A hub assembly is provided for a human powered vehicle. The hub assembly basically includes a hub axle, a hub body, a thru-axle and an electrical cable. The thru-axle is configured to be disposed in a through bore of the hub axle. The electrical cable includes a first cable section extending from an interior space of the hub body through an opening in the hub axle and into the through bore. The electrical cable includes a second cable section extending in the axial direction within the through bore. The electrical cable includes an axially expandable cable section between the first cable section and the second cable section. The axially expandable cable section extends in the axial direction within the through bore. The axially expandable cable section is expandable in the axial direction in response to movement of the thru-axle relative to the hub axle.

22 Claims, 20 Drawing Sheets

30
40b
40
40a
W1
31
36
L1
36a
33
W3
33a
W2
32
43
42
46
L2
38
50
44
64
60
66
62
O1
A1
R1
54b
52
56
54
54a
46
44

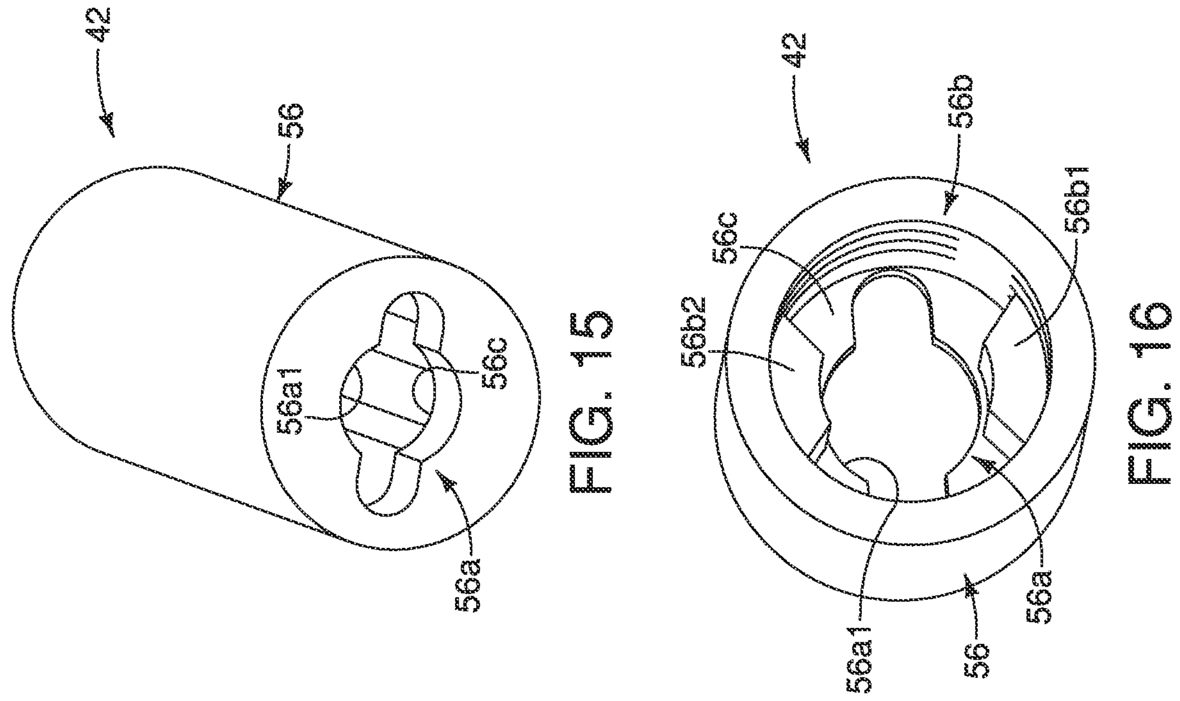
42
56
56a1
56c
56a
FIG. 15
42
56b
56b1
56c
56b2
56a1
56
56a
FIG. 16
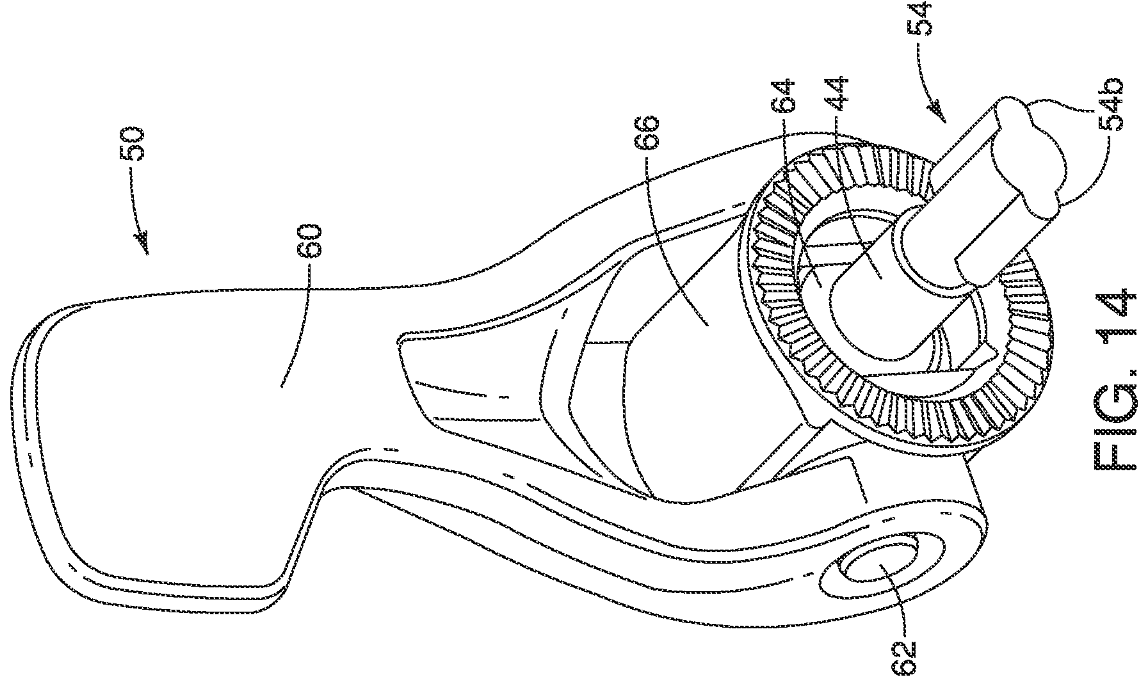
50
60
66
64
44
54
54b
62
FIG. 14

HUB ASSEMBLY FOR HUMAN POWERED VEHICLE

BACKGROUND

Technical Field

This disclosure generally relates to a hub assembly for a human powered vehicle.

Background Information

Generally, a wheel for a human-powered vehicle has a hub, a plurality of spokes and an annular rim. Basically, the hub has a hub axle and a hub body. The hub axle is non-rotatably mounted to a frame of the human-powered vehicle. The hub body is coaxially coupled to the hub axle so that the hub body is disposed radially outwardly with respect to the hub axle. Bearings are configured and arranged to rotatably support the hub body so that the hub body can freely rotate around the hub axle. In some human-powered vehicles, such as bicycles, the hub is provided with a drive portion for receiving a driving force to rotate the wheel in a driving direction. For example, the hub is provided with a sprocket support body that is rotatably disposed to the hub axle. The sprocket support body can be configured to support one or more sprockets for receiving a driving force. The sprocket support body is usually coupled to the hub body by a one-way clutch such that torque is transferred from the sprocket support body to the hub body in one direction. This type of sprocket support body is sometimes called a freewheel. Freewheels are used so that the human-powered vehicle can advance freely without any rotation of the pedals (i.e., during coasting). During coasting, the freewheel is considered to be in a state of free-wheeling in which the wheel can freely rotate while the sprockets remain stationary.

SUMMARY

Generally, the present disclosure is directed to various features of a hub assembly for a human-powered vehicle. The term "human-powered vehicle" as used herein refers to a vehicle that can be propelled by at least human driving force to produce propulsion, but does not include a vehicle using only a driving power other than human power. In particular, a vehicle solely using an internal combustion engine as a driving power is not included in the human-powered vehicle. The human-powered vehicle is generally assumed to be a compact, light vehicle that sometimes does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, and a recumbent bike, and an electric assist bicycle (E-bike).

In view of the state of the known technology and in accordance with a first aspect of the present disclosure, a hub assembly is provided for a human powered vehicle. The hub assembly basically includes a hub axle, a hub body, a thru-axle and an electrical cable. The hub axle has a through bore and a center axis defining an axial direction and a radial direction. The hub body is rotatably disposed around the center axis and has an interior space defined between the hub body and the hub axle in the radial direction. The thru-axle is configured to be disposed in the through bore of the hub axle. The electrical cable including a first cable section extending from the interior space of the hub body through an opening in the hub axle and into the through bore. The electrical cable includes a second cable section extending in the axial direction within the through bore. The electrical cable includes an axially expandable cable section between the first cable section and the second cable section. The axially expandable cable section extends in the axial direction within the through bore. The axially expandable cable section is expandable in the axial direction in response to movement of the thru-axle relative to the hub axle.

With the hub assembly according to the first aspect, the thru-axle can be moved in the axial direction relative to the hub axle without damaging the electrical cable.

In accordance with a second aspect of the present disclosure, the hub assembly according to first aspect is configured so that the axially expandable cable section includes a coiled section spirally wrapped around the thru-axle.

With the hub assembly according to the second aspect, the axially expandable cable section of electrical cable can reliably expand in the axial direction when the thru-axle is moved axially relative to the hub axle.

In accordance with a third aspect of the present disclosure, the hub assembly according to the first aspect or the second aspect is configured so that the axially expandable cable section includes an undulating section disposed in the through bore and extending in the axial direction.

With the hub assembly according to the third aspect, the axially expandable cable section of electrical cable can reliably expand in the axial direction when the thru-axle is moved axially relative to the hub axle.

In accordance with a fourth aspect of the present disclosure, the hub assembly according to the third aspect is configured so that the undulating section includes a flexible flat electrical cable.

With the hub assembly according to the fourth aspect, the axially expandable cable section of electrical cable can reliably expand in the axial direction when the thru-axle is moved axially relative to the hub axle.

In accordance with a fifth aspect of the present disclosure, the hub assembly according to any one of the first aspect to the fourth aspect is configured so that the axially expandable cable section includes an elastic section disposed in the through bore and extending in the axial direction.

With the hub assembly according to the fifth aspect, the axially expandable cable section of electrical cable can reliably expand in the axial direction when the thru-axle is moved axially relative to the hub axle.

In accordance with a sixth aspect of the present disclosure, the hub assembly according to the fifth aspect is configured so that the elastic section includes an electrical conductor wire spirally wound around an elastic main cable and disposed inside a flexible outer sheath.

With the hub assembly according to the sixth aspect, the axially expandable cable section of electrical cable can reliably expand in the axial direction when the thru-axle is moved axially relative to the hub axle.

In accordance with a seventh aspect of the present disclosure, the hub assembly according to any one of the first aspect to the sixth aspect is configured so that the thru-axle includes a first shaft portion, a second shaft portion and an intermediate shaft portion disposed between the first shaft portion and the second shaft portion. The intermediate shaft portion has a radial width that is smaller than a radial width of the first shaft portion and a radial width of the second shaft portion to define recessed area of the thru-axle. The axially expandable cable section is disposed in the recessed area of the thru-axle between an outer surface of the intermediate shaft portion and an inner surface of the hub axle in the radial direction.

With the hub assembly according to the seventh aspect, it is possible to provide the axially expandable cable section of the electrical cable to the intermediate shaft portion so that the thru-axle can be moved in the axial direction relative to the hub axle without damaging the electrical cable.

In accordance with an eighth aspect of the present disclosure, the hub assembly according to the seventh aspect is configured so that the axially expandable cable section includes a coiled section spirally wrapped around the intermediate shaft portion.

With the hub assembly according to the eighth aspect, the axially expandable cable section of electrical cable can reliably expand in the axial direction when the thru-axle is moved axially relative to the hub axle.

In accordance with a ninth aspect of the present disclosure, the hub assembly according to the seventh aspect is configured so that the axially expandable cable section includes an undulating section disposed in the recessed area of the thru-axle.

With the hub assembly according to the ninth aspect, the axially expandable cable section of electrical cable can reliably expand in the axial direction when the thru-axle is moved axially relative to the hub axle.

In accordance with a tenth aspect of the present disclosure, the hub assembly according to the ninth aspect is configured so that the undulating section includes a flexible flat electrical cable.

With the hub assembly according to the tenth aspect, the axially expandable cable section of electrical cable can reliably expand in the axial direction when the thru-axle is moved axially relative to the hub axle.

In accordance with an eleventh aspect of the present disclosure, the hub assembly according to any one of the seventh aspect to the tenth aspect is configured so that the axially expandable cable section includes an elastic section disposed in the recessed area of the thru-axle.

With the hub assembly according to the eleventh aspect, the axially expandable cable section of electrical cable can reliably expand in the axial direction when the thru-axle is moved axially relative to the hub axle.

In accordance with a twelfth aspect of the present disclosure, the hub assembly according to the eleventh aspect is configured so that the elastic section includes an electrical conductor wire spirally wound around an elastic main cable and disposed inside a flexible outer sheath.

With the hub assembly according to the twelfth aspect, the axially expandable cable section of electrical cable can reliably expand in the axial direction when the thru-axle is moved axially relative to the hub axle.

In accordance with a thirteenth aspect of the present disclosure, the hub assembly according to any one of the eighth aspect to the twelfth aspect further comprises an electrical connector coupled to an axial end of the thru-axle. The electrical connector is electrically connected to an end of the second cable section that is opposite to the axially expandable cable section.

With the hub assembly according to the thirteenth aspect, the electrical cable can be easily connected to an electric component or a charging device.

In accordance with a fourteenth aspect of the present disclosure, the hub assembly according to the thirteenth aspect is configured so that the electrical connector is at least partly disposed in a connector hole of the axial end of the thru-axle.

With the hub assembly according to the fourteenth aspect, the electrical connector can be reliably coupled to the axial end of the first axle part of the thru-axle.

In accordance with a fifteenth aspect of the present disclosure, the hub assembly according to the fourteenth aspect is configured so that the electrical connector includes at least one electrical pin that partly projects from the axial end of the thru-axle.

With the hub assembly according to the fifteenth aspect, the electrical connector can be easily connected to a mating electrical connector.

In accordance with a sixteenth aspect of the present disclosure, the hub assembly according to the fifteenth aspect is configured so that the at least one electrical pin is configured to be rotatably disposed in a connector hole such that relative rotation between the at least one electrical pin and the first axle part is permitted.

With the hub assembly according to the sixteenth aspect, the first axle part can be rotated relative to the at least one electrical pin such that twisting of the electrical cable can be reduced.

In accordance with a seventeenth aspect of the present disclosure, a hub assembly is provided for a human powered vehicle. The hub assembly basically comprises a hub axle, a hub body, a thru-axle and an electrical cable. The hub axle has a through bore and a center axis defining an axial direction and a radial direction. The hub body is rotatably disposed around the center axis. The hub body has an interior space defined between the hub body and the hub axle in the radial direction. The thru-axle is configured to be axially disposed in the through bore of the hub axle. The electrical cable includes a first cable section extending from the interior space of the hub body through an opening in the hub axle and into the through bore. The electrical cable includes a second cable section extending in the axial direction within the through bore. The electrical cable includes a third cable section having a first terminal and a second terminal spaced apart from the first terminal in the axial direction. The thru-axle includes an outer surface having a first electrode and a second electrode that are spaced in the axial direction. The first terminal is in sliding contact with the first electrode and the second terminal is in sliding contact with the second electrode such that electrical contact is maintained between the first terminal and the first electrode and between the second terminal and the second electrode in a case where the thru-axle moves in the axial direction.

With the hub assembly according to the seventeenth aspect, the thru-axle can be moved in the axial direction relative to the hub axle without damaging the electrical cable.

In accordance with an eighteenth aspect of the present disclosure, the hub assembly according to the seventeenth aspect is configured so that the thru-axle includes a first shaft portion, a second shaft portion and an intermediate shaft portion disposed between the first shaft portion and the second shaft portion. The intermediate shaft portion has a radial width that is smaller than a radial width of the first shaft portion and a radial width of the second shaft portion to define recessed area of the thru-axle. The first electrode and the second electrode are disposed on the intermediate shaft portion. The first terminal and the second terminal are disposed in the recessed area of the thru-axle between an outer surface of the intermediate shaft portion and an inner surface of the hub axle that defines the through bore in the radial direction.

With the hub assembly according to the eighteenth aspect, it is possible to provide the axially expandable cable section of the electrical cable to the intermediate shaft portion so that the thru-axle can be moved in the axial direction relative to the hub axle without damaging the electrical cable.

In accordance with a nineteenth aspect of the present disclosure, the hub assembly according to the seventeenth aspect or the eighteenth aspect further comprises an electrical connector coupled to an axial end of the thru-axle. The electrical connector is electrically connected to an end of the second cable section that is opposite to the first electrode and the second electrode.

With the hub assembly according to the nineteenth aspect, the electrical cable can be easily connected to an electric component or a charging device.

In accordance with a twentieth aspect of the present disclosure, the hub assembly according to the nineteenth aspect is configured so that the electrical connector is at least partly disposed in a connector hole of the axial end of the thru-axle.

With the hub assembly according to the twentieth aspect, the electrical connector can be reliably coupled to the axial end of the first axle part of the thru-axle.

In accordance with a twenty-first aspect of the present disclosure, the hub assembly according to the twentieth aspect is configured so that the electrical connector includes at least one electrical pin that partly projects from the axial end of the thru-axle.

With the hub assembly according to the twenty-first aspect, the electrical connector can be easily connected to a mating electrical connector.

In accordance with a twenty-second aspect of the present disclosure, the hub assembly according to the twenty-first aspect is configured so that the at least one electrical pin is configured to be rotatably disposed in the connector hole such that relative rotation between the at least one electrical pin and the first axle part is permitted.

With the hub assembly according to the twenty-second aspect, the first axle part can be rotated relative to the at least one electrical pin such that twisting of the electrical cable can be reduced.

Also, other objects, features, aspects and advantages of the disclosed hub assembly will become apparent to those skilled in the art from the following detailed description, which, taken in conjunction with the annexed drawings, discloses preferred embodiments of the hub assembly.

BRIEF DESCRIPTION OF THE DRAWINGS

Referring now to the attached drawings which form a part of this original disclosure.

FIG. 14 is a perspective view of the second axle part of the thru-axle and the frame attachment structure illustrated in FIGS. 7 to 9.

FIG. 15 is a first perspective view of a first connection end portion of a first axle part of the thru-axle illustrated in FIGS. 7 to 9.

FIG. 16 is a second perspective view of the first connection end portion of the first axle part illustrated in FIG. 15.

DETAILED DESCRIPTION

Selected embodiments will now be explained with reference to the drawings. It will be apparent to those skilled in the human-powered vehicle field (e.g., the bicycle field) from this disclosure that the following descriptions of the embodiments are provided for illustration only and not for the purpose of limiting the invention as defined by the appended claims and their equivalents.

Figure 1:
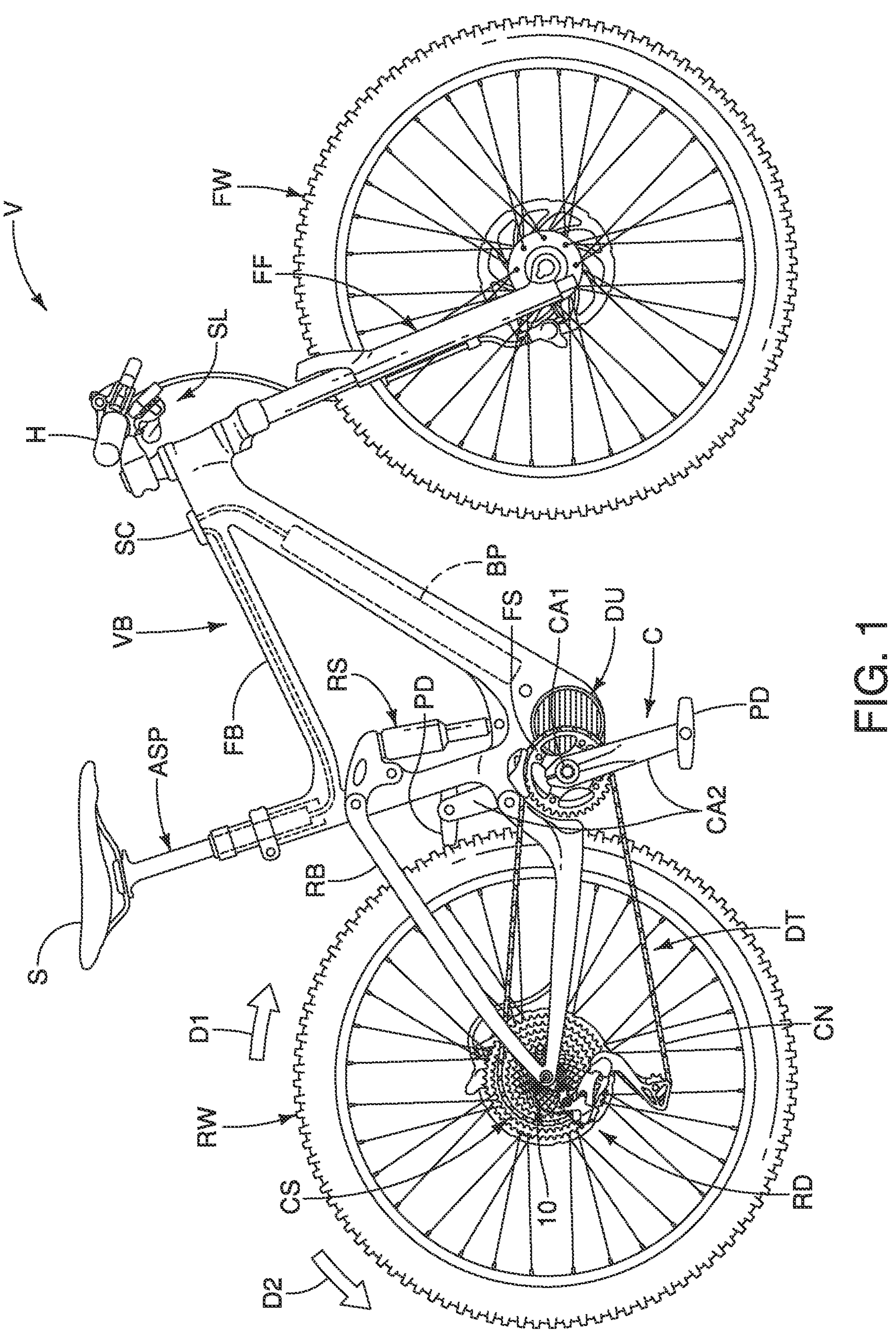
FIG. 1 is a side elevational view of a human-powered vehicle (e.g., a bicycle) equipped with a hub assembly in accordance with a first embodiment.

Referring initially to FIG. 1, a hub assembly 10 is provided for a human powered vehicle V (i.e., a bicycle) in accordance with a first illustrated embodiment. Here, in the first embodiment, the hub assembly 10 is a bicycle rear hub assembly. The hub assembly 10 can be used with other human-powered vehicles as needed and/or desired. The hub assembly 10 is configured to be removably mounted to the human-powered vehicle V as discussed below.

Here, the human-powered vehicle V is an electric assist bicycle (E-bike). Alternatively, the human-powered vehicle V can be a road bicycle, a city bike, a cargo bike, and a recumbent bike, or another type of off-road bicycle such as a cyclocross bicycle. The number of wheels on the human-powered vehicle V is not limited. The human-powered vehicle V includes, for example, a monocycle and a vehicle having three or more wheels. Here, the human-powered vehicle V is a bicycle that at least partially uses human power as a driving power for traveling and includes an electric drive unit assisting the human power. In particular, a vehicle using solely an internal combustion engine as driving power is not included in the human-powered vehicle of this disclosure.

As seen in FIG. 1, the human-powered vehicle V includes a vehicle body VB that is supported by a rear wheel RW and a front wheel FW. The vehicle body VB basically includes a front frame body FB and a rear frame body RB (a swing arm). The vehicle body VB is also provided with a handlebar H and a front fork FF for steering the front wheel FW. The rear frame body RB is swingably mounted to a rear section of the front frame body FB such that the rear frame body RB can pivot with respect to the front frame body FB. The rear wheel RW is mounted to a rear end of the rear frame body RB. A rear shock absorber RS is operatively disposed between the front frame body FB and rear frame body RB. The rear shock absorber RS is provided between the front frame body FB and the rear frame body RB to control the movement of the rear frame body RB with respect to the front frame body FB. Namely, the rear shock absorber RS absorbs shock transmitted from the rear wheel RW. The rear wheel RW is rotatably mounted to the rear frame body RB. The front wheel FW is mounted to the front frame body FB via the front fork FF. Namely, the front wheel FW is mounted to a lower end of the front fork FF. A height adjustable seatpost ASP is mounted to a seat tube of the front frame body FB in a conventional manner and supports a bicycle seat or saddle S in any suitable manner. The front fork FF is pivotally mounted to a head tube of the front frame body FB. The handlebar H is mounted to an upper end of a steering column steerer tube of the front fork FF. The front fork FF absorbs shock transmitted from the front wheel FW. Preferably, the rear shock absorber RS and the front fork FF are electrically adjustable suspensions. For example, the stiffness and/or stoke length of the rear shock absorber RS and the front fork FF can be adjusted.

The human-powered vehicle V further includes a drivetrain DT and an electric drive unit DU that is operatively coupled to the drivetrain DT. Here, for example, the drivetrain DT is a chain-drive type that includes a crank C, a front sprocket FS, a plurality of rear sprockets CS and a chain CN. The crank C includes a crank axle CA1 and a pair of crank arms CA2. The crank axle CA1 is rotatably supported to the front frame body FB via the electric drive unit DU. The crank arms CA2 are provided on opposite ends of the crank axle CA1. A pedal PD is rotatably coupled to the distal end of each of the crank arms CA2. The drivetrain DT can be selected from any type, and can be a belt-drive type or a shaft-drive type.

The electric drive unit DU has an electric motor that provides a drive assist force to the front sprocket FS. The electric drive unit DU can be actuated to assist in the propulsion of the human-powered vehicle V in a conventional manner. The electric drive unit DU is actuated, for example, in accordance with a human driving force applied to the pedals PD. The electric drive unit DU is actuated by electric power supplied from a main battery pack BP that is mounted on a downtube of the human-powered vehicle V. The main battery pack BP can provide electrical power to other vehicle components such as the electric rear derailleur RD, the height adjustable seatpost ASP, the rear shock absorber RS, the front fork FF and any other vehicle component that uses electrical power.

The human-powered vehicle V further includes a cycle computer SC. Here, the cycle computer SC is mounted to the front frame body FB. Alternatively, the cycle computer SC can be provided on the handlebar H. The cycle computer SC notifies the rider of various traveling and/or operating conditions of the human-powered vehicle V. The cycle computer SC can also include various control programs for automatically controlling one or more vehicle components. For example, the cycle computer SC can be provided with an automatic shifting program for changing gears of the electric rear derailleur RD based on one or more traveling and/or operating conditions of the human-powered vehicle V.

Here, the human-powered vehicle V further includes an electric rear derailleur RD that is attached to the rear frame body RB for shifting the chain CN between the rear sprockets CS. The electric rear derailleur RD is one type of gear changing device. Here, the electric rear derailleur RD is an electric derailleur (i.e., an electric gear changing device or an electric transmission device). Here, the electric rear derailleur RD is provided on the rear side of the rear frame body RB near the hub assembly 10. The electric rear derailleur RD can be operated when a rider of the human-powered vehicle V manually operates a gear shift operating device or shifter SL. The electric rear derailleur RD can also be automatically operated based on traveling conditions and/or operating conditions of the human-powered vehicle V. The human-powered vehicle V can further include a plurality of electronic components.

Figure 2:
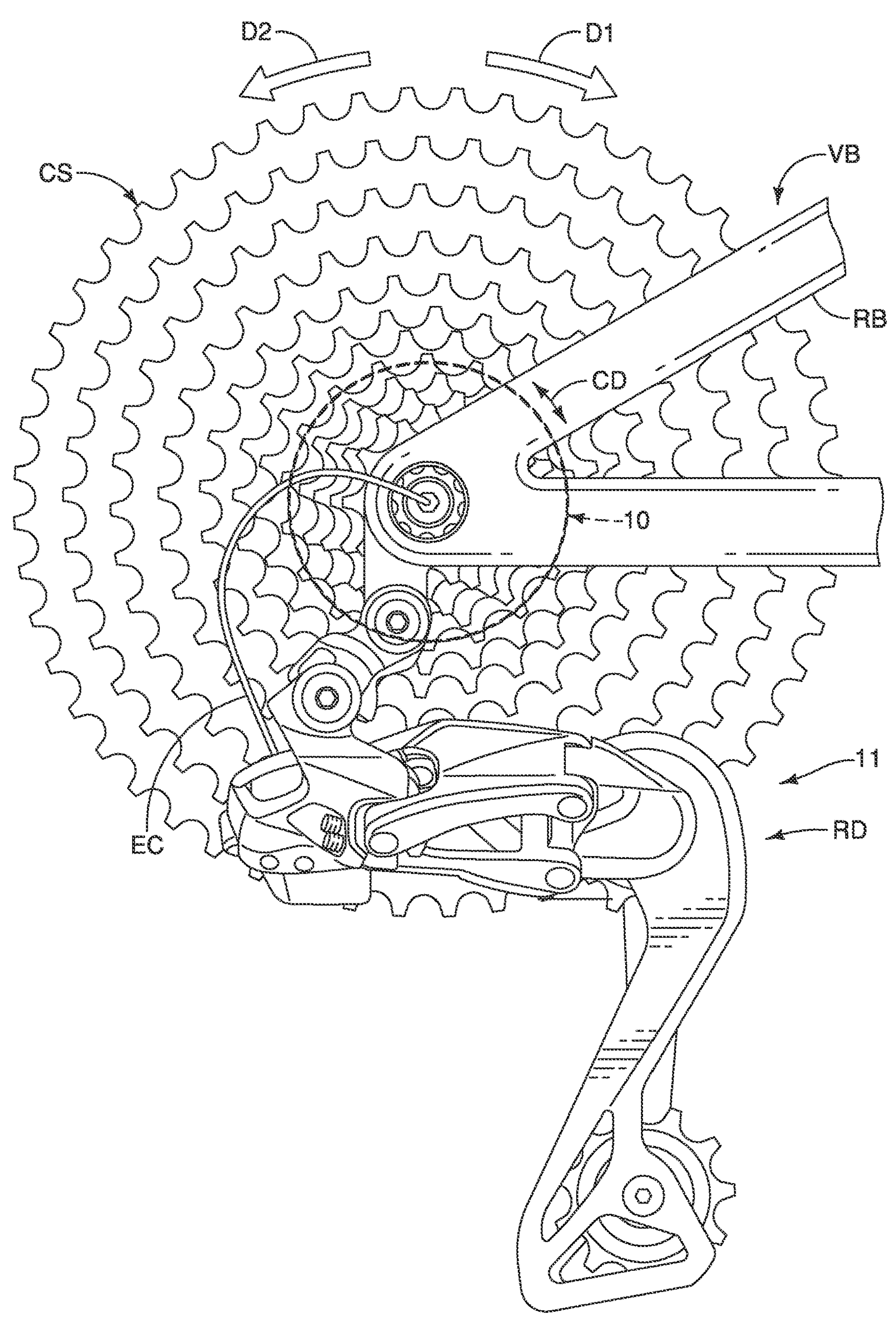
FIG. 2 is a side elevational view of a rear portion of the human-powered vehicle illustrated in FIG. 1 showing an electric rear derailleur and the hub assembly coupled to a vehicle body of the human-powered vehicle in accordance with the first embodiment.
Figure 3:
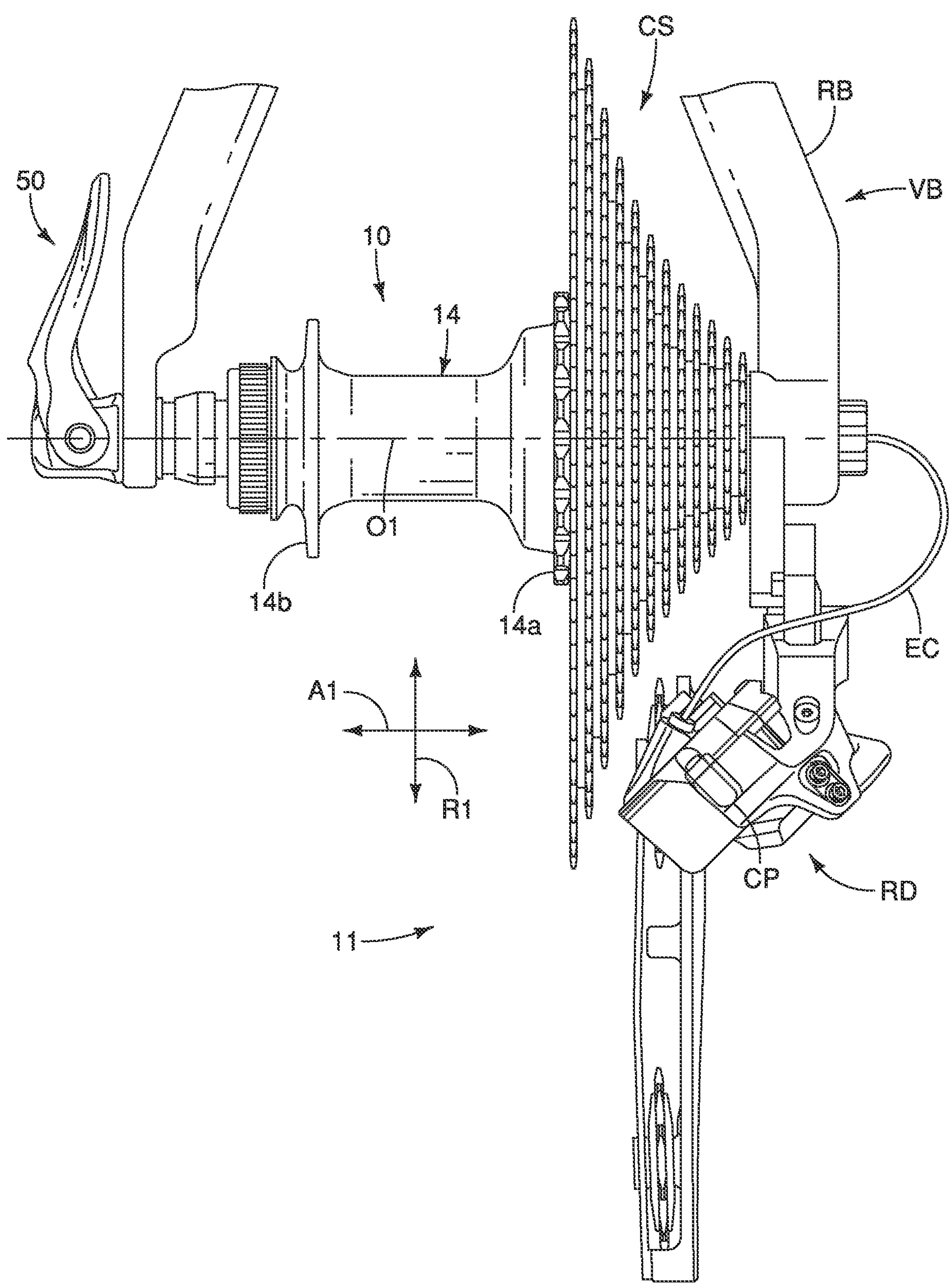
FIG. 3 is a rear elevational view of a rear portion of the human-powered vehicle illustrated in FIGS. 1 and 2 showing the electric rear derailleur and the hub assembly coupled to the vehicle body of the human-powered vehicle in accordance with the first embodiment.

As seen in FIGS. 2 and 3, the hub assembly 10 is support on the rear end of the rear frame body RB. The hub assembly 10 supports the rear sprockets CS for operatively coupling the hub assembly 10 to the chain CN. The hub assembly 10 is electrically coupled to the electric rear derailleur RD by an electrical cable EC. As explained below, the hub assembly 10 is configured to supply electrical power to the electric rear derailleur RD. Moreover, as explained below, the hub assembly 10 is configured to receive electrical power via the electric rear derailleur RD. In particular, as seen in FIG. 3, the electric rear derailleur RD has a charging port CP for receiving a charging cable of a charging device. Thus, a human powered vehicle assembly 11 comprises the hub assembly 10 and an electric component. Here, the human powered vehicle assembly 11 comprises the electric rear derailleur RD as the electric component. Alternatively, the electric component of the human powered vehicle assembly 11 can be another electrical component of the human-powered vehicle V as needed and/or desired.

The structure of the hub assembly 10 will now be described with particular reference to FIGS. 3 to 6. The hub assembly 10 basically comprises a hub axle 12 and a hub body 14. The hub axle 12 has a center axis O1. The center axis O1 defines an axial direction A1 and a radial direction R1. The center axis O1 further defines a circumferential direction C1. The hub axle 12 is configured to be non-rotatably attached to the rear frame body RB of the vehicle body VB. The hub body 14 is rotatably disposed around the center axis O1. In other words, the hub body 14 is rotatably mounted around the hub axle 12. The hub body 14 has an interior space 16. The interior space 16 is defined between the hub body 14 and the hub axle 12 in the radial direction R1. Thus, in the first embodiment, the interior space 16 is an annular space.

Figure 5:
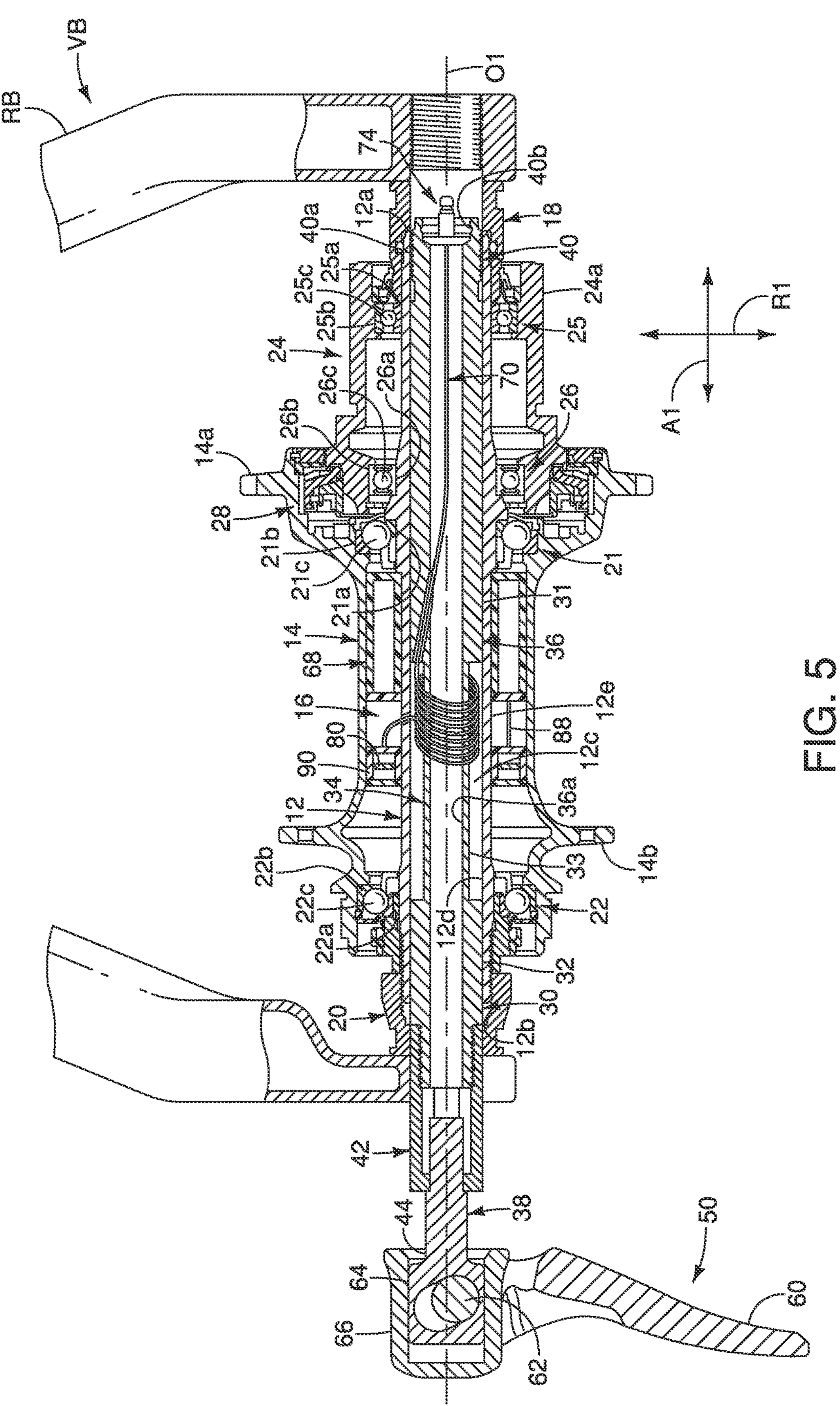
FIG. 5 is a longitudinal cross-sectional view of the hub assembly illustrated in FIGS. 3 and 4 in which the hub assembly is in the process of being coupled to the vehicle body of the human-powered vehicle.
Figure 6:
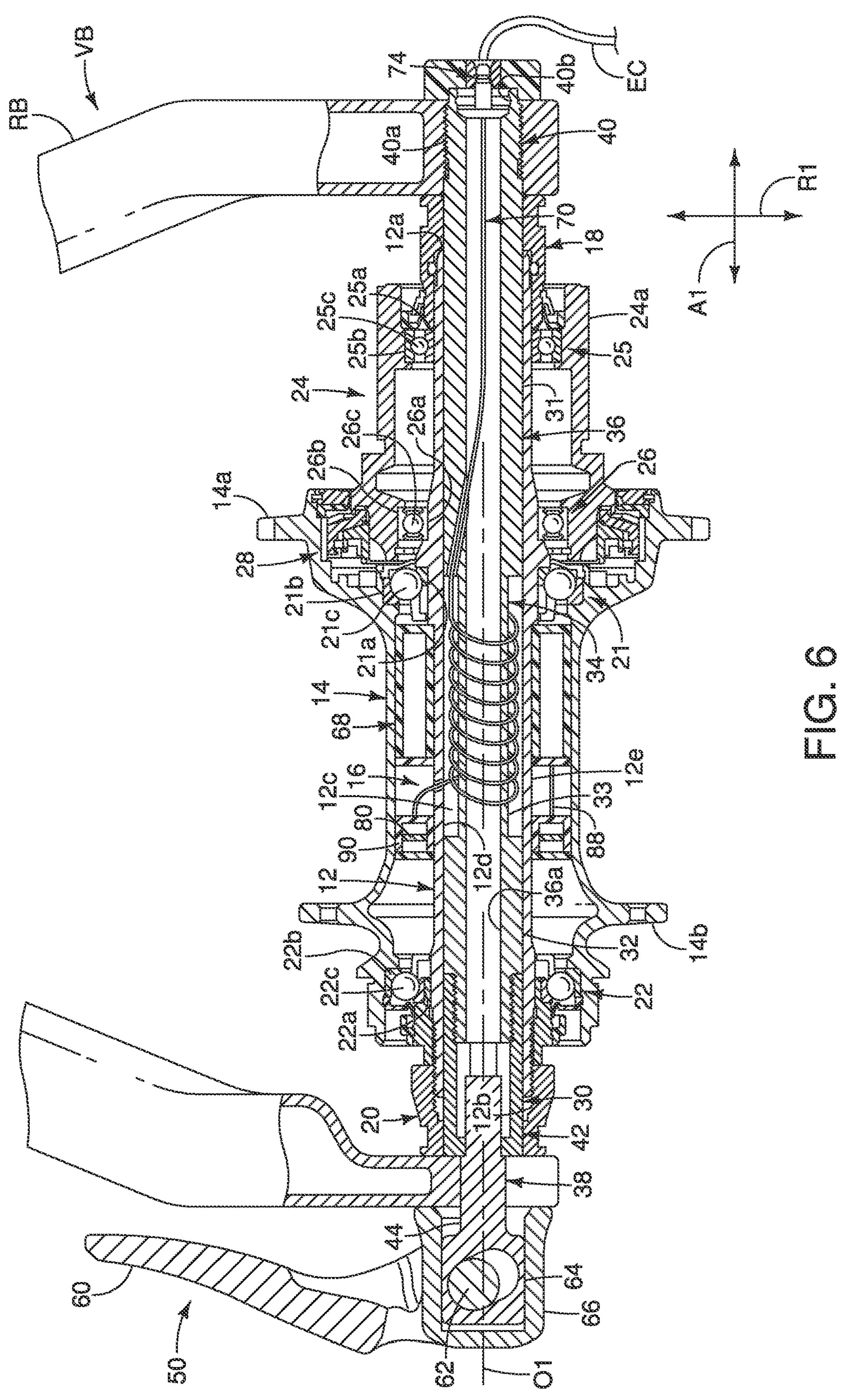
FIG. 6 is a longitudinal cross-sectional view, similar to FIG. 5, of the hub assembly illustrated in FIGS. 3 to 5, but in which the hub assembly has been coupled to the vehicle body of the human-powered vehicle.

As seen in FIGS. 5 and 6, the hub axle 12 is a rigid member made of a suitable material such as a metallic material. The hub axle 12 is preferably made of several pieces that are coupled together. However, the hub axle 12 can be a one-piece member in certain situations if needed and/or desired. Here, the hub axle 12 is a tubular member. The hub axle 12 has a first axial end 12*a* and a second axial end 12*b*. The hub axle 12 has a through bore 12*c*. The through bore 12*c* extends between the first axial end 12*a* and the second axial end 12*b*. In this first embodiment, a first end piece 18 is provided to the first axial end 12*a* (right side in FIGS. 5 and 6) of the hub axle 12, and a second end piece 20 is provided to the second axial end 12*b* (left side in FIGS. 5 and 6) of the hub axle 12. Here, the first end piece 18 is frictionally fitted onto the first axial end 12*a* of the hub axle 12, and the second end piece 20 is threadedly mounted to the second axial end 12*b* of the hub axle 12.

As indicated in FIGS. 2, the hub body 14 is rotatably mounted around the hub axle 12 to rotate in a driving rotational direction D1. The driving rotational direction D1 corresponds to a forward driving direction of the rear wheel RW. The hub body 14 is configured to support the rear wheel RW in a conventional manner. More specifically, in the first embodiment, the hub body 14 includes a first spoke attachment structure 14*a* and a second spoke attachment structure 14*b*. The first spoke attachment structure 14*a* is spaced from the second spoke attachment structure 14*b* in the axial direction A1. The first spoke attachment structure 14*a* is a first annular flange that extend radially outward with respect to the center axis O1. The second spoke attachment structure 14*b* is a second annular flange that extend radially outward with respect to the center axis O1. The first spoke attachment structure 14*a* includes a plurality of first spoke openings, and the second spoke attachment structure 14*b* includes a plurality of second spoke openings. The first spoke attachment structure 14*a* and the second spoke attachment structure 14*b* are configured to receive a plurality of spokes (FIG. 1) for attaching a rim (FIG. 1) of the rear wheel RW to the hub body 14 in a conventional manner. In this way, the hub body 14 and the rear wheel RW are coupled to rotate together about the central axis O1.

As mentioned above, the hub body 14 is rotatably disposed around the hub axle 12 to rotate around the center axis O1. In particular, as seen in FIGS. 5 and 6, the hub body 14 is rotatably supported on the hub axle 12 by a first hub body bearing 21 and a second hub body bearing 22. The first hub body bearing 21 rotatably supports one end of the hub body 14 with respect to the center axis O1. The second hub body bearing 22 rotatably supports the other end of the hub body 14 with respect to the center axis O1.

The first hub body bearing 21 includes a first inner race 21*a*, a first outer race 21*b* and a plurality of first roller elements 21*c*. The first roller elements 21*c* are disposed between the first inner race 21*a* and the first outer race 21*b*. The second hub body bearing 22 includes a second inner race 22*a*, a second outer race 22*b* and a plurality of second roller elements 22*c*. The second roller elements 22*c* are disposed between the second inner race 22*a* and the second outer race 22*b*. Here, the first hub body bearing 21 and the second hub body bearing 22 are angular contact bearings. Alternatively, both the first hub body bearing 21 and the second hub body bearing 22 can be radial bearings. Also, alternatively, one of the first hub body bearing 21 and the second hub body bearing 22 can be an angular contact bearing, and the other one of the first hub body bearing 21 and the second hub body bearing 22 can be a radial bearing.

Angular contact bearings have inner and outer ring raceways that are displaced relative to each other in the direction of the bearing axis. In other words, angular contact bearings are designed to accommodate combined loads, i.e., simultaneously acting radial and axial loads. Angular contact bearings can have a plurality of ball bearings or a plurality of tapered rollers as the roller elements. Radial bearings support force in the direction perpendicular to the axis. Further, a radial roller bearing can be adopted instead of the angular contact roller bearings. Radial bearings can have a plurality of ball bearings or a plurality of cylindrical rollers as the roller elements.

Figure 4:
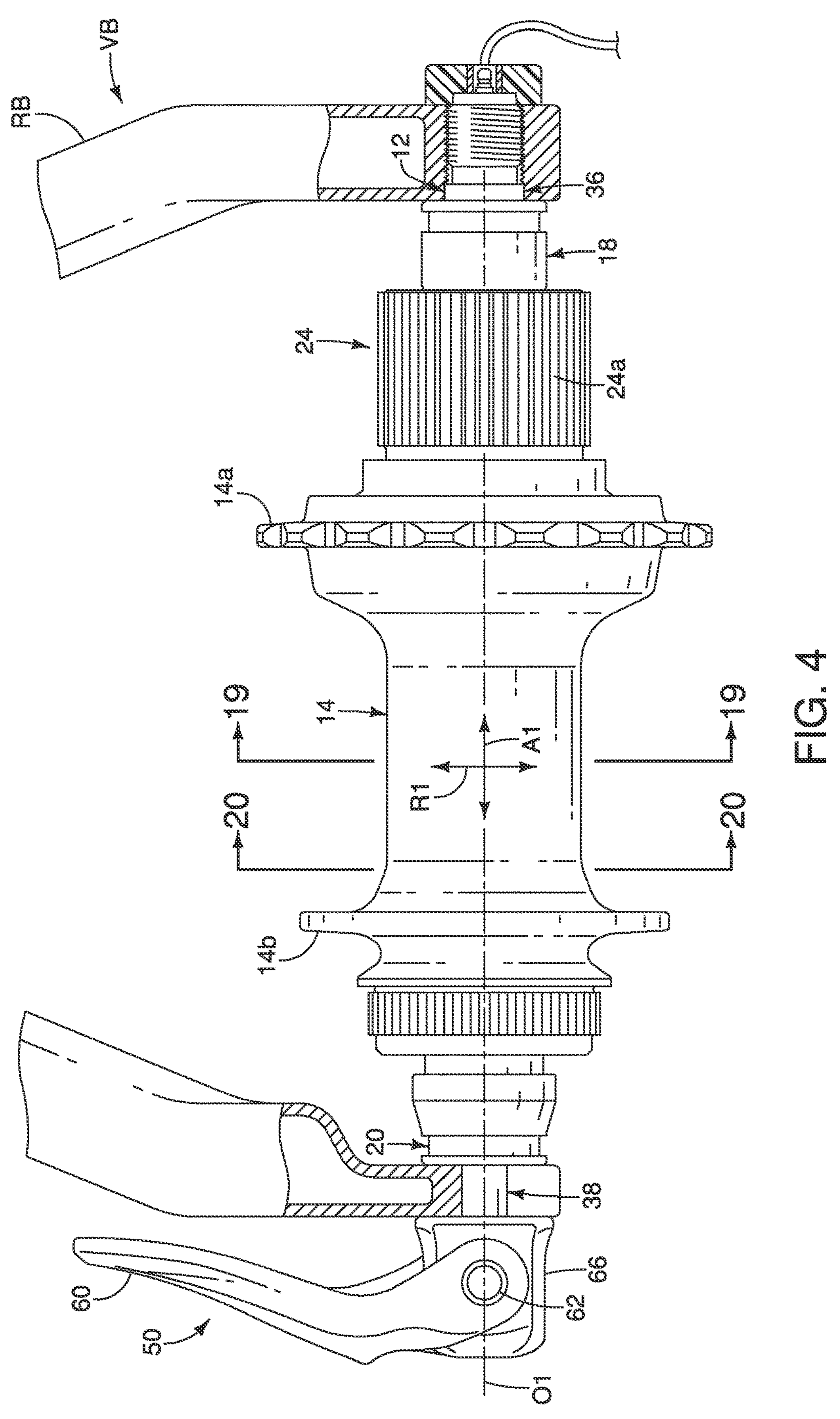
FIG. 4 is an enlarged rear elevational view of the hub assembly illustrated in FIG. 3 in which the hub assembly is coupled to the vehicle body of the human-powered vehicle.

Referring to FIG. 4, the hub assembly 10 further comprises a sprocket support body 24. The sprocket support body 24 is a rigid member made of a suitable material such as a metallic material. The center axis of the sprocket support body 24 is disposed concentrically with the center axis O1. The sprocket support body 24 is rotatably disposed around the hub axle 12 to rotate around the center axis O1. In particular, the sprocket support body 24 is rotatably supported around the hub axle 12 by a first sprocket support bearing 25 and a second sprocket support bearing 26. As illustrated in FIG. 3, the sprocket support body 24 is configured to support the plurality of sprockets CS. The sprocket support body 24 is configured to non-rotatably support the sprockets CS. Here, the sprocket support body 24 has a plurality of external splines 24*a* that are configured to engage the sprockets CS. In this way, the sprockets CS are non-rotatably coupled to the sprocket support body 24. The external splines 24*a* form a sprocket attachment structure of the hub assembly 10. However, the sprocket support body 24 is not limited to the illustrated embodiment. Alternatively, one or more of the rear sprockets CS can be integrally formed with the sprocket support body 24. Basically, the sprocket support body 24 is configured to rotate around the center axis O1 to transmit a driving force to the hub body 14 while rotating in the driving rotational direction D1 around the center axis O1. However, the sprocket support body 24 does not transmit a driving force to the hub body 14 while rotating in a non-driving rotational direction D2 around the center axis O1. The non-driving rotational direction D2 is opposite to the driving rotational direction D2 with respect to the center axis O1. In any case, the sprocket support body 24 and the sprockets CS are coupled together to rotate together in both the driving rotational direction D1 and the non-driving rotational direction D2.

Referring to FIGS. 5 and 6, the first sprocket support bearing 25 and the second sprocket support bearing 26 are axially spaced apart along the hub axle 12. The first sprocket support bearing 25 rotatably supports a first end of the sprocket support body 24. The second sprocket support bearing 26 rotatably supports a second end of the sprocket support body 24. The first sprocket support bearing 25 includes a first inner race 25*a*, a first outer race 25*b* and a plurality of first roller elements 25*c*. The first roller elements 25*c* are disposed between the first inner race 25*a* and the first outer race 25*b*. The second sprocket support bearing 26 includes a second inner race 26*a*, a second outer race 26*b* and a plurality of second roller elements 26*c*. The second roller elements 26*c* are disposed between the second inner race 26*a* and the second outer race 26*b*. Here, the first sprocket support bearing 25 and the second sprocket support bearing 26 are radial ball bearings. Alternatively, both the first sprocket support bearing 25 and the second sprocket support bearing 26 can be angular contact bearings. Also, alternatively, one the first sprocket support bearing 25 and the second sprocket support bearing 26 can be an angular contact bearing, and the other one of the first sprocket support bearing 25 and the second sprocket support bearing 26 can be a radial bearing.

In the illustrated embodiment, as seen in FIGS. 5 and 6, the rear hub 10 further comprises a torque transmitting mechanism 28 disposed between the hub body 14 and the sprocket support body 24 to transmit a rotational force to the hub body 14 from the sprocket support body 24. The torque transmitting mechanism 28 forms a one-way clutch such that torque is transferred from the sprocket support body 24 to the hub body 14 in one direction. In this way, the rotational force imparted to the sprocket support body 24 from the rear sprockets CS during pedaling in the driving rotational direction is transmitted to hub body 14. During coasting, the sprocket support body 24 can be stationary and the hub body 14 can rotate in the driving rotational direction. Torque transmitting mechanisms such as the torque transmitting mechanism 28 are well known in the human-powered vehicle field (e.g., the bicycle field). Thus, the torque transmitting mechanism 28 will not be described in further detail.

Referring now to FIGS. 4 and 5, the hub assembly 10 further comprises a thru-axle 30. The thru-axle 30 is a rigid member made of a suitable material such as a metallic material. The thru-axle 30 is configured to be non-rotatably attached to the rear frame body RB of the vehicle body VB. The thru-axle 30 is configured to be disposed in the through bore 12*c* of the hub axle 12. When the thru-axle 30 is fixed to the rear frame body RB of the vehicle body VB, the hub axle 12 is also non-rotatably is fixed to the rear frame body RB of the vehicle body VB. More specifically, when the thru-axle 30 is fixed to the rear frame body RB of the vehicle body VB, the rear frame body RB of the vehicle body VB is squeezed against the first end piece 18 and the second end piece 20 to prevent the hub axle 12 from rotating relative to the thru-axle 30 and the rear frame body RB.

Figures 12, 13:
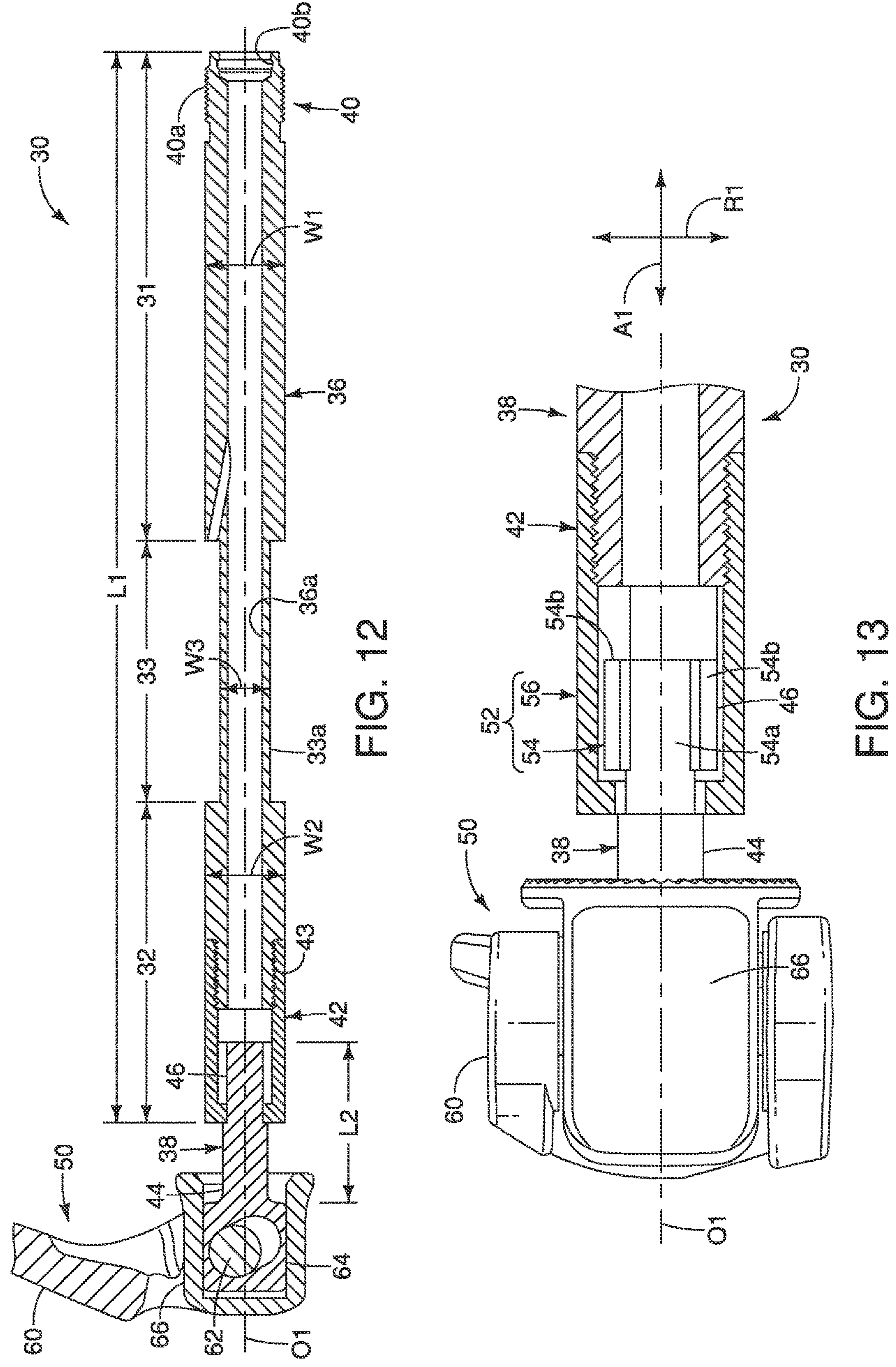
FIG. 12 is a longitudinal cross-sectional view of the thru-axle illustrated in FIGS. 7 to 9.
FIG. 13 is an enlarged longitudinal cross-sectional view of a portion of the thru-axle illustrated in FIG. 12.

Basically, as seen in FIGS. 7 to 13, the thru-axle 30 includes a first shaft portion 31, a second shaft portion 32 and an intermediate shaft portion 33. The intermediate shaft portion 33 is disposed between the first shaft portion 31 and the second shaft portion 32. Referring to FIG. 12, the first shaft portion 31 has a radial width W1 in the radial direction R1 with respect to the center axis O1. The radial width W1 can also be referred to a first radial width W1 of the thru-axle 30. The second shaft portion 32 has a radial width W2 in the radial direction R1 with respect to the center axis O1. The radial width W2 can also be referred to a second radial width W2 of the thru-axle 30. The intermediate shaft portion 33 has a radial width W3 that is smaller than the radial width W1 of the first shaft portion 31 and the radial width W2 of the second shaft portion 32 to define a recessed area 34 of the thru-axle 30. The radial width W3 can also be referred to a third radial width W3 of the thru-axle 30.

Figure 7:
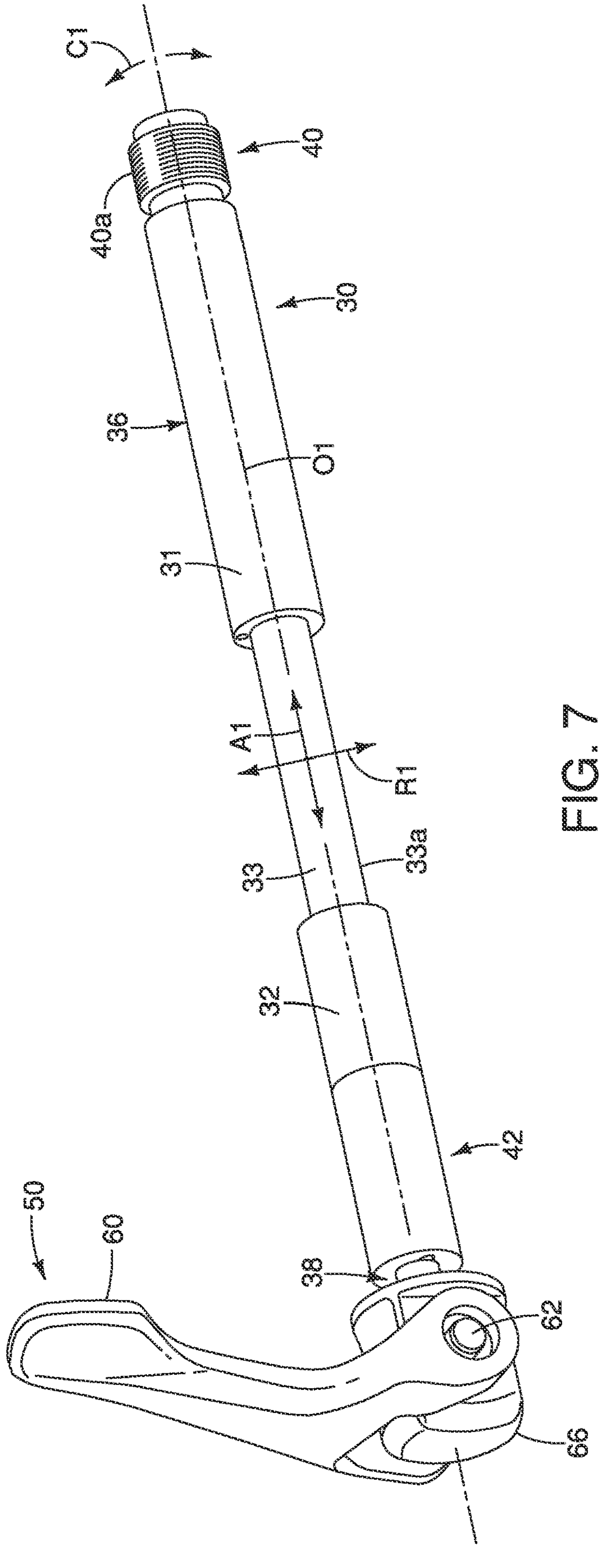
FIG. 7 is a perspective view of the thru-axle of the hub assembly illustrated in FIGS. 3 to 6.
Figures 8, 9:
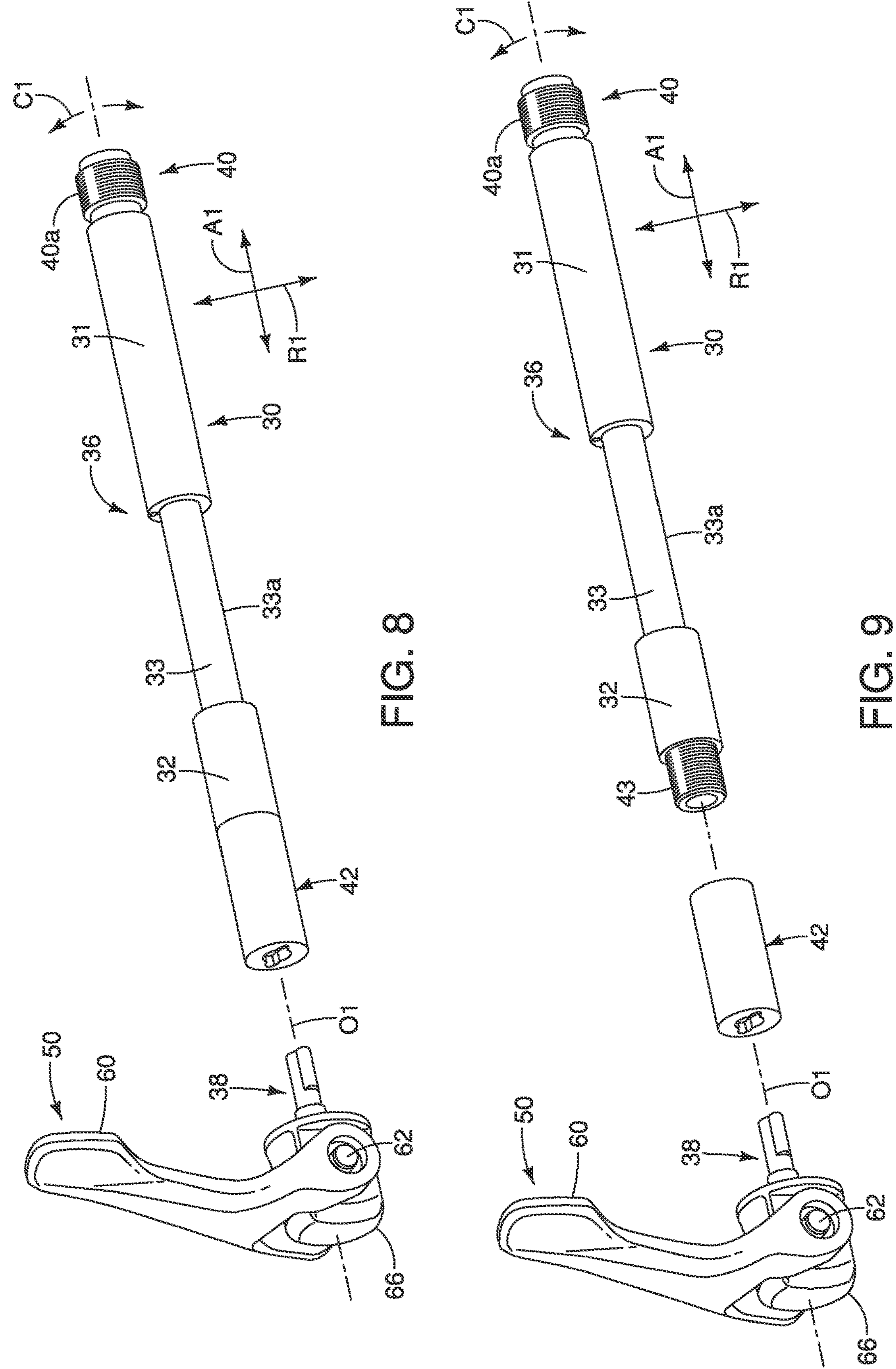
FIG. 8 is a partly exploded perspective view of the thru-axle illustrated in FIG. 7.
FIG. 9 is a further exploded perspective view of the thru-axle illustrated in FIGS. 7 and 8.
Figure 11:
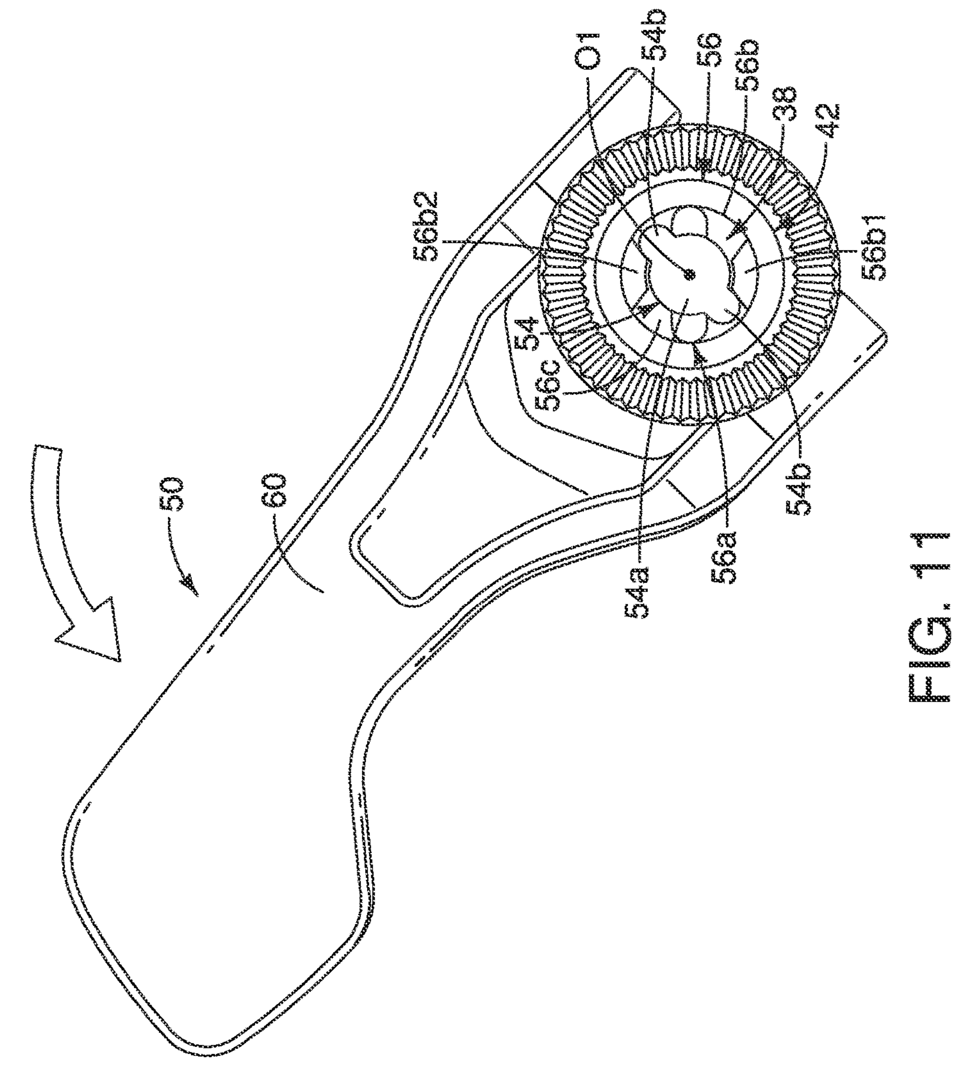
FIG. 11 is an axial view elevational view of the selected parts of the thru-axle illustrated in FIG. 10 in which the second axle part and the frame attachment structure have been twisted to be positioned in a second orientation.
Figure 10:
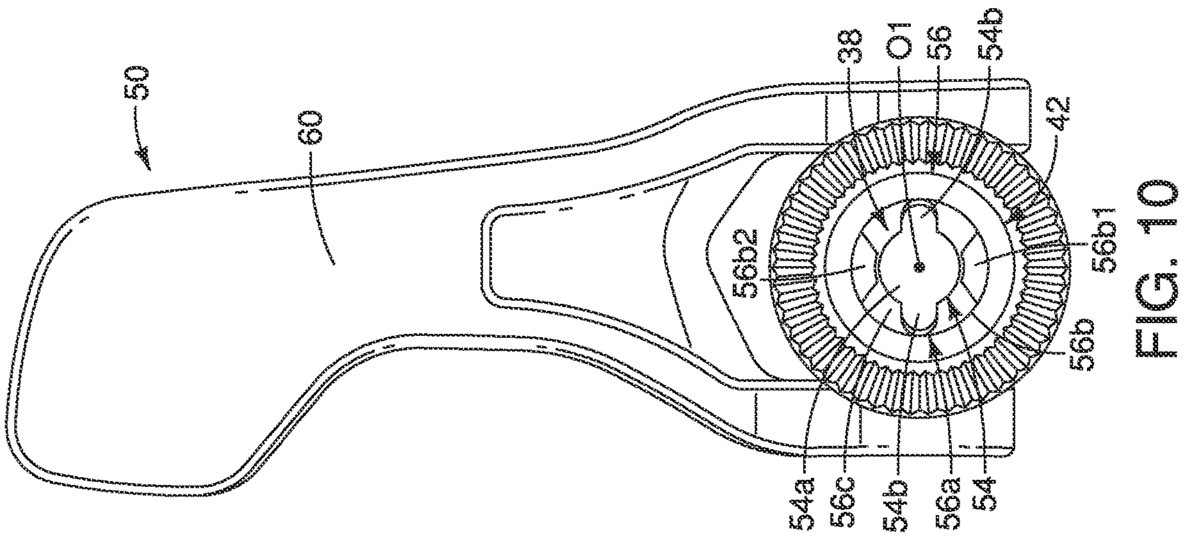
FIG. 10 is an axial view elevational view of selected parts of the thru-axle illustrated in FIGS. 7 to 9 in which a second axle part of the thru-axle and a frame attachment structure are in positioned a first orientation.

In the first embodiment, as seen in FIGS. 7 to 9, the thru-axle 30 comprises a first axle part 36, and a second axle part 38. As discussed below, the second axle part 38 is detachably coupled to the first axle part 36 in the axial direction A1. The first axle part 36 includes the first shaft portion 31, the second shaft portion 32 and the intermediate shaft portion 33. The first axle part 36 includes an axial bore 36*a*. The axial bore 36*a* extends at least axially through the first shaft portion 31, the second shaft portion 32 and the intermediate shaft portion 33. Here, the axial bore 36*a* extends axially through the first shaft portion 31. The first axle part 36 has a first axle length L1. The second axle part 38 has a second axle length L2. The first axle length L1 is larger than the second axle length L2.

Here, the first axle part 36 has a first attachment end portion 40 and a first connection end portion 42. The first attachment end portion 40 includes an external thread 40*a* that is configured to threadedly engage an internal thread of a fixing nut, or a fork or a frame. Here, the external thread 40*a* of the first attachment end portion 40 of the first axle part 36 is threadedly engaged with an internal thread of the rear frame body RB. The first connection end portion 42 is configured to be detachably coupled to the second axle part 38. In the first embodiment, the first axle part 36 is made of two pieces. In particular, the first connection end portion 42 is detachably coupled from a reminder of the first axle part 36. More specifically, as discussed below, the first axle part 36 has an external thread 40*b* that is configured to threadedly engage an internal thread 42*a* of the first connection end portion 42.

The second axle part 38 has a second attachment end portion 44 and a second connection end portion 46. The thru-axle 30 further comprises a frame attachment structure 50. The frame attachment structure 50 is coupled to the second attachment end portion 44 of the second axle part 38. In this way, the frame attachment structure 50 couples the second attachment end portion 44 of the second axle part 38 to the rear frame body RB. On the other hand, the second connection end portion 46 of the second axle part 38 is detachably coupled to the first connection end portion 42 of the first axle part 36. In particular, the second connection end portion 46 of the second axle part 38 is detachably coupled to the first connection end portion 42 of the first axle part 36 by a twist-lock connection 52. Basically, the twist-lock connection 52 includes a male connector 54 and a female receptacle 56. The male connector 54 is provided to one of the first connection end portion 42 and the second connection end portion 46 of the second axle part 38. The female receptacle 56 is provided to the other of the first connection end portion 42 of the first axle part 36 and the second connection end portion 46 of the second axle part 38. More specifically, here, the first connection end portion 42 includes the female receptacle 56, and the second connection end portion 46 includes the male connector 54.

As seen in FIG. 14, the male connector 54 includes a shaft portion 54*a* having a protrusion 54*b* extending from the shaft portion 54*a* in the radial direction R1. The rod portion 54*a* extends along the center axis O1 in the assembled state. Here, the protrusion 54*b* includes a pair of diametrically disposed abutments that project radially from the rod portion 54*a* with respect to the center axis O1 in the assembled state.

As seen in FIGS. 15 and 16, the female receptacle 56 includes an insertion section 56*a*, a retaining section 56*b*, and an abutment surface 56*c*. The abutment surface 56*c* is disposed between the insertion section insertion section 56*a* and the retaining section 56*b*. Here, the insertion section 56*a* includes an opening 56*a*1 that is configured to receive the male connector 54 therethrough while the male connector 54 is in a first orientation. The retaining section 56*b* is a tubular portion that extends from the insertion section 56*a* to define an internal space. The retaining section 56*b* includes a pair of stops 56*b*1 and 56*b*2. The shaft portion 54*a* and the protrusion 54*b* are configured to slide in the axial direction A1 through the insertion section 56*a* and are twisted in the retaining section 56*b* to engage the protrusion 54*b* with the abutment surface 56*c*. Thus, the abutment surface 56*c* contacts the protrusion 54*b* to prevent axial separation of the second axle part 38 from the first axle part 36 while the male connector 54 is in a second orientation in which the male connector 54 has been twisted about the center axis O1 so that the protrusion 54*b* contact the stops 56*b*1 and 56*b*2. Thus, the first orientation of the male connector 54 is established by aligning the protrusion 54*b* with the opening 56*al* so that the male connector 54 can slide in the axial direction A1 through the insertion section 56*a*. The second orientation of the male connector 54 is established by twisting the male connector 54 so that the protrusion 54*b* contact the stops 56*b*1 and 56*b*2 and the protrusion 54*b* engage the abutment surface 56*c*.

Referring to FIGS. 12 to 14, the frame attachment structure 50 includes a control lever 60, a cam 62 and a cam follower 64. The cam 62 is configured to be pivoted by the control lever 60. The cam follower 64 is configured to move in the axial direction A1 in response to operation of the control lever 60. The cam follower 64 is integrally formed with the second attachment end portion 44 of the second axle part 38. Here, the control lever 60 is pivotally coupled to the cam follower 64 by the cam 62 for moving a frame engagement cap 36*e* with respect to the attachment bolt 36*b* in an axial direction of the attachment bolt 36*b*. Thus, by pivoting the control lever 60 between a first (open) position to a second (closed) position, the control lever 60 pivots the cam 62 to change the distance between a frame engagement cap 66 and the second end piece 20. In this way, the frame attachment structure 50 attaches the hub axle 12 and the thru-axle 30 to the rear frame body RB of the vehicle body VB.

Figure 17:
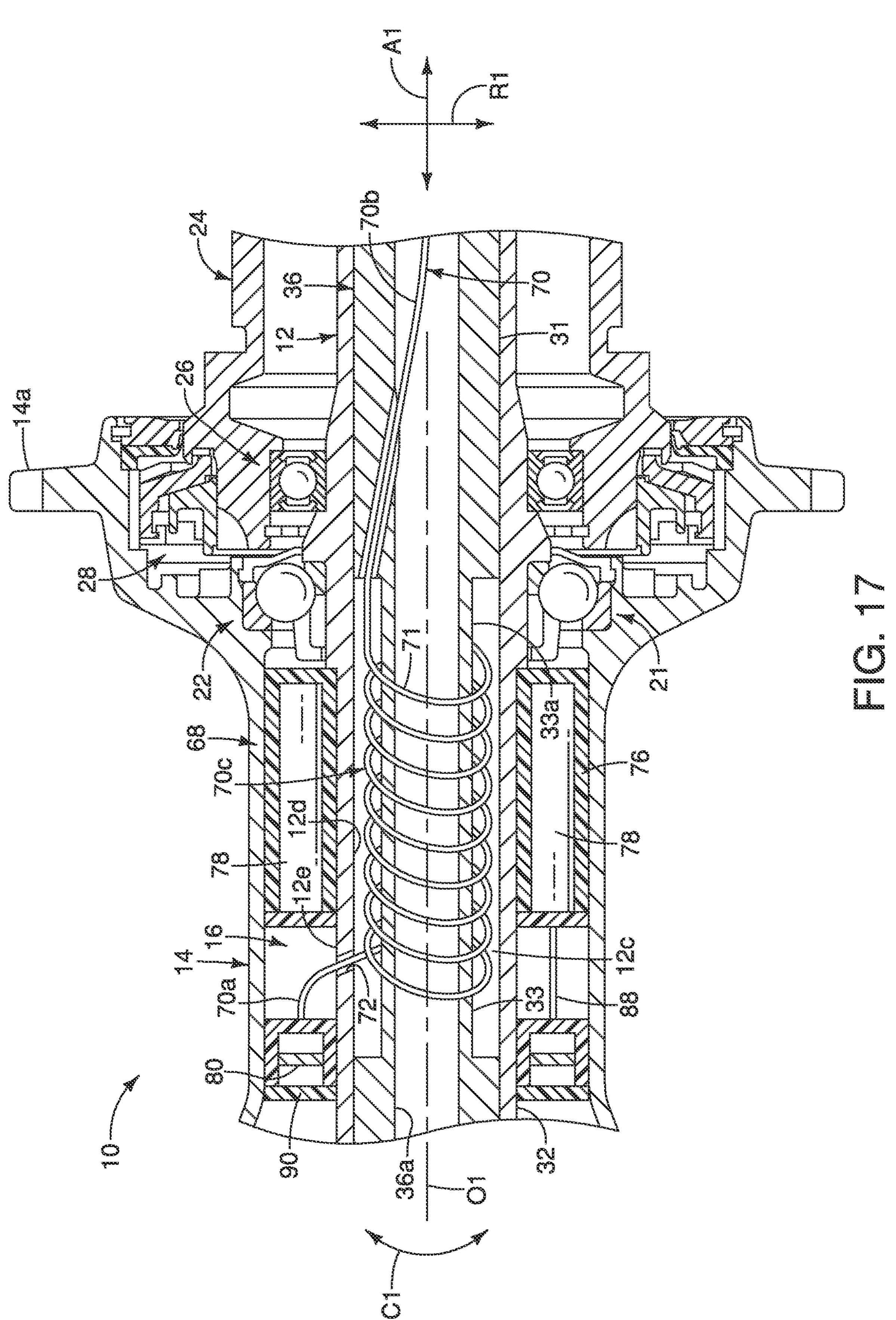
FIG. 17 is an enlarged longitudinal cross-sectional view of a middle portion of the hub assembly illustrated in FIG. 6.
Figures 19, 20:
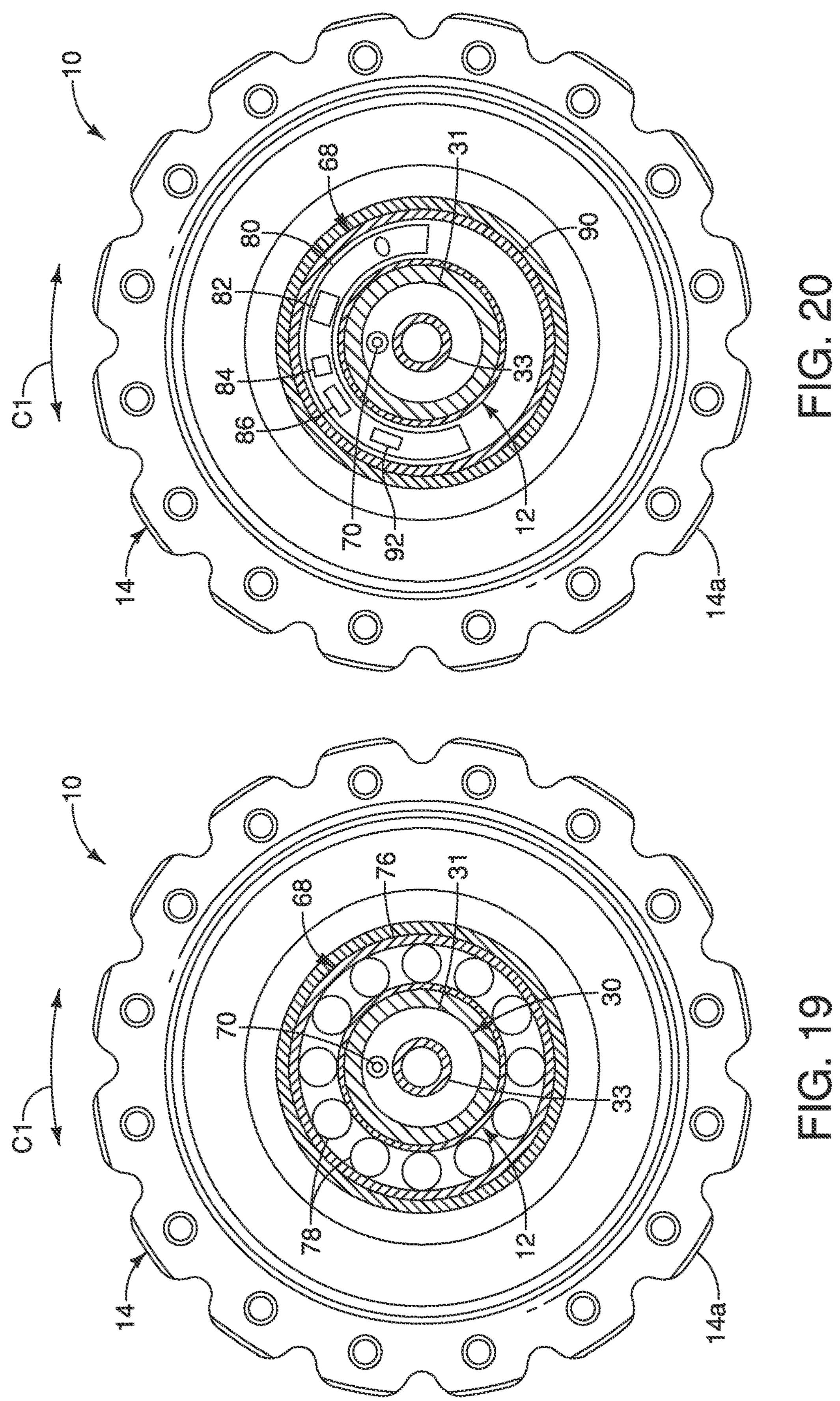
FIG. 19 is a first transverse cross-sectional view of the hub assembly illustrated in FIGS. 3 to 6 as seen along section line 19-19 of FIG. 4.
FIG. 20 is a second transverse cross-sectional view of the hub assembly illustrated in FIGS. 3 to 6 as seen along section line 20-20 of FIG. 4.

Referring to FIGS. 17, 19 and 20, the hub assembly 10 further comprises an electrical power storage device 68. At least a portion of the electrical power storage device 68 is axially disposed between the first spoke attachment structure 14*a* and the second spoke attachment structure 14*b*. Here, the electrical power storage device 68 is entirely disposed with respect to the axial direction A1 between the first spoke attachment structure 14*a* and the second spoke attachment structure 14*b*.

The electrical power storage device 68 is configured to supply electricity to an electric component. Specifically, in the first embodiment, the electrical power storage device 68 is configured to supply electricity to an electric component that is different from the hub assembly 10. The electrical power storage device 68 is configured to receive electricity from the electric component. In the first embodiment, the electric component corresponds to the electric rear derailleur RD. However, the electric component can be a different component of the human-powered vehicle V (e.g., bicycle).

The hub assembly 10 further comprises an electrical cable 70. The electrical cable 70 is electrically connected to the electrical power storage device 68 and an electric component (e.g., the electric rear derailleur RD). In this way, the electrical power storage device 68 is configured to supply electricity to an electric component (e.g., the electric rear derailleur RD) via the electrical cable 70. Also, the electrical power storage device 68 is configured to receive electricity from an electric component (e.g., the electric rear derailleur RD) via the electrical cable 70. In the first embodiment, the electrical power storage device 68 supplies electricity to the electric rear derailleur RD via the electrical cable 70, and receives electricity from the electric rear derailleur RD via the electrical cable 70.

Basically, the electrical cable 70 extends from the interior space 16 of the hub body 14 through an opening 72 in the hub axle 12 and into the through bore 12*c*. The electrical cable 70 is partly disposed in the recessed area 34 of the first axle part 36 between an outer surface 33*a* of the intermediate shaft portion 33 and an inner surface 12*d* of the hub axle 12 that defines the through bore 12*c*. In particular, the electrical cable 70 includes a first cable section 70*a* extending from the interior space 16 of the hub body 14 through the opening 72 in the hub axle 12 and into the through bore 12*c*. The electrical cable 70 includes a second cable section 70*b* extending in the axial direction A1 within the through bore 12*c*. In particular, the second cable section 70*b* of the electrical cable 70 extends in the axial direction A1 along a section of the first axle part 36. In particular, the second cable section 70*b* of the electrical cable 70 through a section of the axial bore 36*a* along the first shaft portion 31 of the first axle part 36.

The electrical cable 70 includes an axially expandable cable section 70*c* between the first cable section 70*a* and the second cable section 70*b*. The axially expandable cable section 70*c* extends in the axial direction A1 within the through bore 12*c*. The axially expandable cable section 70*c* is expandable in the axial direction A1 in response to movement of the thru-axle 30 relative to the hub axle 12.

In this embodiment, as seen in FIG. 17, the axially expandable cable section 70*c* includes a coiled section 71 spirally wrapped around the thru-axle 30. In particular, the coiled section 71 is spirally wrapped around the intermediate shaft portion 33. Thus, the axially expandable cable section 70*c* is disposed in the recessed area 34 of the thru-axle 30 between the outer surface 33*a* of the intermediate shaft portion 33 and the inner surface 12*d* of the hub axle 12 in the radial direction R1. The coiled section 71 is expandable in the axial direction A1 by the coiled section 71 being uncoiled or coiled in response to movement of the thru-axle 30 relative to the hub axle 12.

Figure 18:
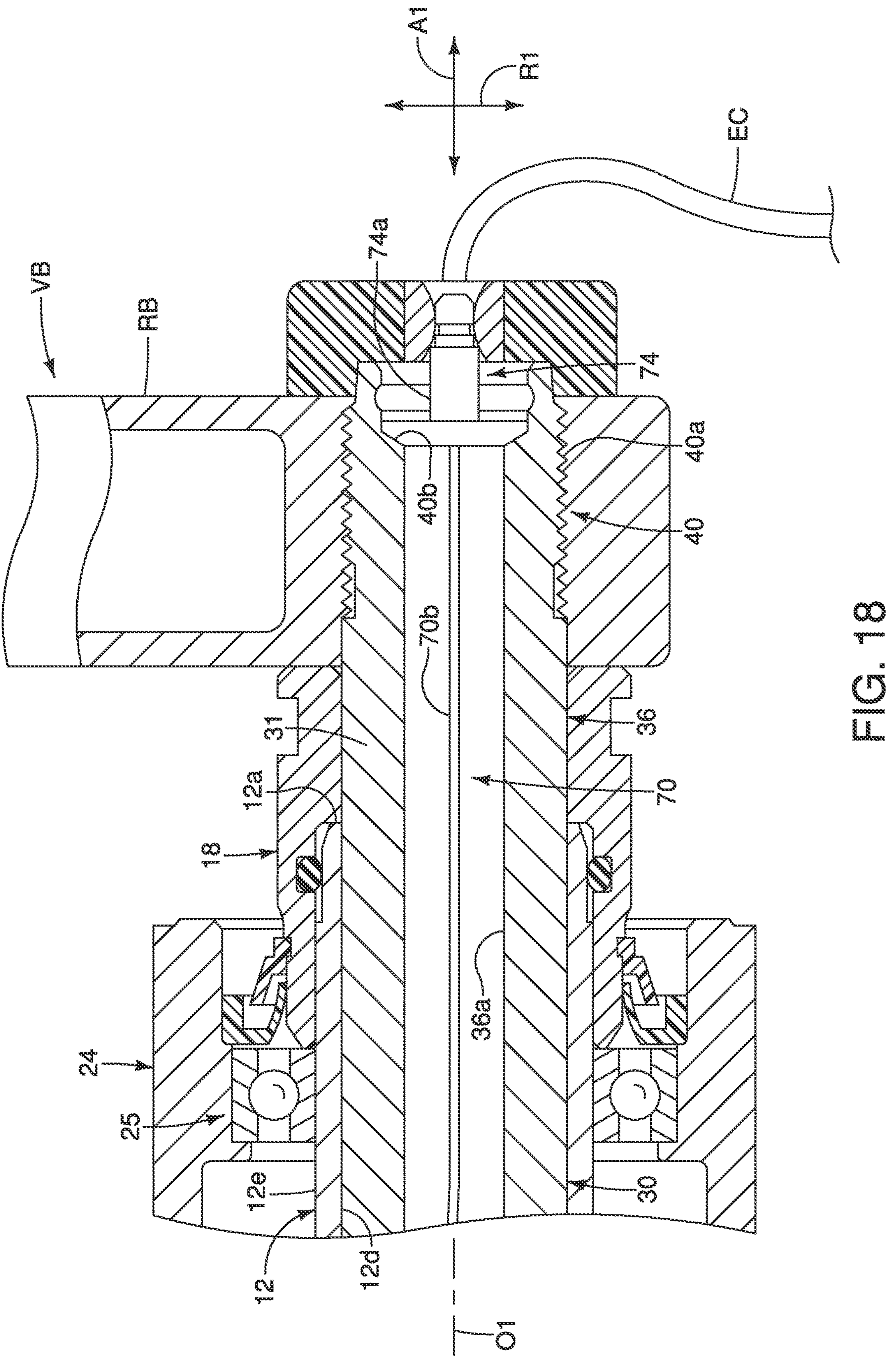
FIG. 18 is an enlarged longitudinal cross-sectional view of a first end portion of the hub assembly illustrated in FIG. 6.

As seen in FIG. 18, the hub assembly 10 further comprises an electrical connector 74. The electrical connector 74 is coupled to an axial end of the thru-axle 30. Specifically, the electrical connector 74 is coupled to an axial end of the first axle part 36. The axial end of the first axle part 36 is opposite to the second axle part 38. Thus, in the first embodiment, the electrical connector 74 is coupled to the first attachment end portion 40 of the first axle part 36. The electrical connector 74 is at least partly disposed in a connector hole 40*b* of the axial end of the thru-axle 30. More specifically, the electrical connector 74 is at least partly disposed in the connector hole 40*b* of the axial end of the first axle part 36. The electrical connector 74 includes at least one electrical pin 74*a*. The at least one electrical pin 74*a* partly projects from the axial end of the thru-axle 30. Specifically, the at least one electrical pin 74*a* partly projecting from the axial end of the first axle part 36. The at least one electrical pin 74*a* is configured to be rotatably disposed in the connector hole 40*b* such that relative rotation between the at least one electrical pin 74*a* and the first axle part 36 is permitted. The electrical connector 74 is electrically connected to the electrical cable 70. In particular, the electrical connector 74 is electrically connected to an end of the second cable section 70*b* that is opposite to the axially expandable cable section 70*c*.

Referring to FIGS. 6 and 17, the electrical power storage device 68 will now be discussed in further detail. The electrical power storage device 68 is disposed radially outward of an outer surface 12*e* of the hub axle 12. In particular, the electrical power storage device 68 is disposed in the interior space 16. Also, in the first embodiment, the electrical power storage device 68 is disposed axially inward of the sprocket attachment structure (e.g., the external splines 24*a* of the sprocket support body 24). In particular, the electrical power storage device 68 is disposed axially inward of the first axial end 12*a* of the hub axle 12 and the second axial end 12*b* of the hub axle 12. Preferably, the electrical power storage device 68 surrounds at least half of the outer surface of the hub axle 12 in the circumferential direction C1. In the first embodiment, the electrical power storage device 68 surrounds the outer surface 12*e* of the hub axle 12 in the circumferential direction C1.

Preferably, at least a portion of the electrical power storage device 68 axially overlaps the hub body 14. More preferably, an entire axial length of the electrical power storage device 68 axially overlaps the hub body 14. At least a portion of the electrical power storage device 68 is axially disposed between the first spoke attachment structure 14*a* and the second spoke attachment structure 14*b*. In the first embodiment, an entire axial length of the electrical power storage device 68 is disposed between the first spoke attachment structure 14*a* and the second spoke attachment structure 14*b* in the axial direction A1.

The electrical power storage device 68 includes a casing 76. The electrical power storage device 68 further includes at least one battery 78. The at least one battery 78 is disposed in the casing 76. The electrical power storage device 68 surrounds the outer surface 12*e* of the hub axle 12 in the circumferential direction C1. Thus, here, the casing 76 is at least partly arc shaped and surrounds the outer surface 12*e* of the hub axle 12 in the circumferential direction C1. Moreover, the battery 78 surrounds the outer surface 12*e* of the hub axle 12 in the circumferential direction C1. In the first embodiment, the electrical power storage device 68 includes a plurality of batteries 78 disposed to surround the hub axle 12 in the circumferential direction C1. The batteries 78 are cylindrical shaped members that are elongated in the axial direction A1. The batteries 78 are disposed circumferentially around the outer surface 12*e* of the hub axle 12 in the circumferential direction C1. Here, the batteries 78 are rechargeable batteries.

As diagrammatically illustrated in FIG. 20, the electrical power storage device 68 further includes a circuit board 80 having an electronic controller 82, a power control circuit 84 and a wireless communication circuit 86. The circuit board 80 is electrically connected to the batteries 78 by an electrical cable 88 for receiving electric power from the batteries 78 and supplying electric power to the batteries 78. Thus, the batteries 78 supply electric power to the electronic controller 82, the power control circuit 84 and the wireless communication circuit 86. Here, the circuit board 80 having the electronic controller 82, the power control circuit 84 and the wireless communication circuit 86 are provided in a casing 90. Alternatively, the circuit board 80 having the electronic controller 82, the power control circuit 84 and the wireless communication circuit 86 can be provided in the casing 76.

For example, in the first embodiment, the electronic controller 82, the power control circuit 84 and the wireless communication circuit 86 are provided on a common circuit board (i.e., the circuit board 80) containing any number of integrated circuit or circuits for completing the activities described herein. Also, while the controller 82 is illustrated as being a single unit located on the circuit board 80, the electrical power storage device 68 is not limited to this configuration. Rather, the electrical power storage device 68 can be provided with a plurality of circuit board 80 and/or a plurality of controllers that are provided at various locations.

The electronic controller 82 is configured to control the power control circuit 84 and the wireless communication circuit 86. The electronic controller 82 includes at least one processor that executes predetermined control programs. The at least one processor can be, for example, a central processing unit (CPU) or a micro processing unit (MPU). The electronic controller 82 also preferably includes a data storage device (memory) for storing various control programs and information used for various control processes. The data storage device (memory) is any computer storage device or any computer readable medium with the sole exception of a transitory propagating signal. For example, the memory device can be nonvolatile memory and volatile memory, and can includes a ROM (Read Only Memory) device, a RAM (Random Access Memory) device, a hard disk, a flash drive, etc. The term "electronic controller" as used herein refers to hardware that executes a software program, and does not include a human being.

The power control circuit 84 is configured to control the charging of the batteries 78 and the supply of electric power from the batteries 78 where the electric power delivered via the electrical cable 70. On the other hand, the wireless communication circuit 86 configured to control the charging of the batteries 78 and the supply of electric power from the batteries 78 where the electric power delivered wirelessly. Thus, the electrical power storage device 68 is configured to wirelessly supply electricity to an electric component. The electrical power storage device 68 is configured to wirelessly receive electricity from the electric component. Here, for example, the wireless communication circuit 86 includes at least a non-contact charging coil for carrying out magnetic resonance to transfer electric power to and from the batteries 78. Alternatively, the wireless communication circuit 86 can be configured to carry out Near-Field Communication (NFC). The term "NFC" as used herein refers to short-range wireless communication that achieves communication by electromagnetic induction to transfer electric power to and from the batteries 78. Preferably, an AC/DC converter 92 is disposed between the wireless communication circuit 86 and the batteries 78. The AC/DC converter 92 is provided on the circuit board 80. The AC/DC converter 92 converts the alternating current outputted by the wireless communication circuit 86 to direct current that is received by the batteries 78. In this way, the direct current outputted by the AC/DC converter 92 is used to recharge the batteries 78.

Figure 21:
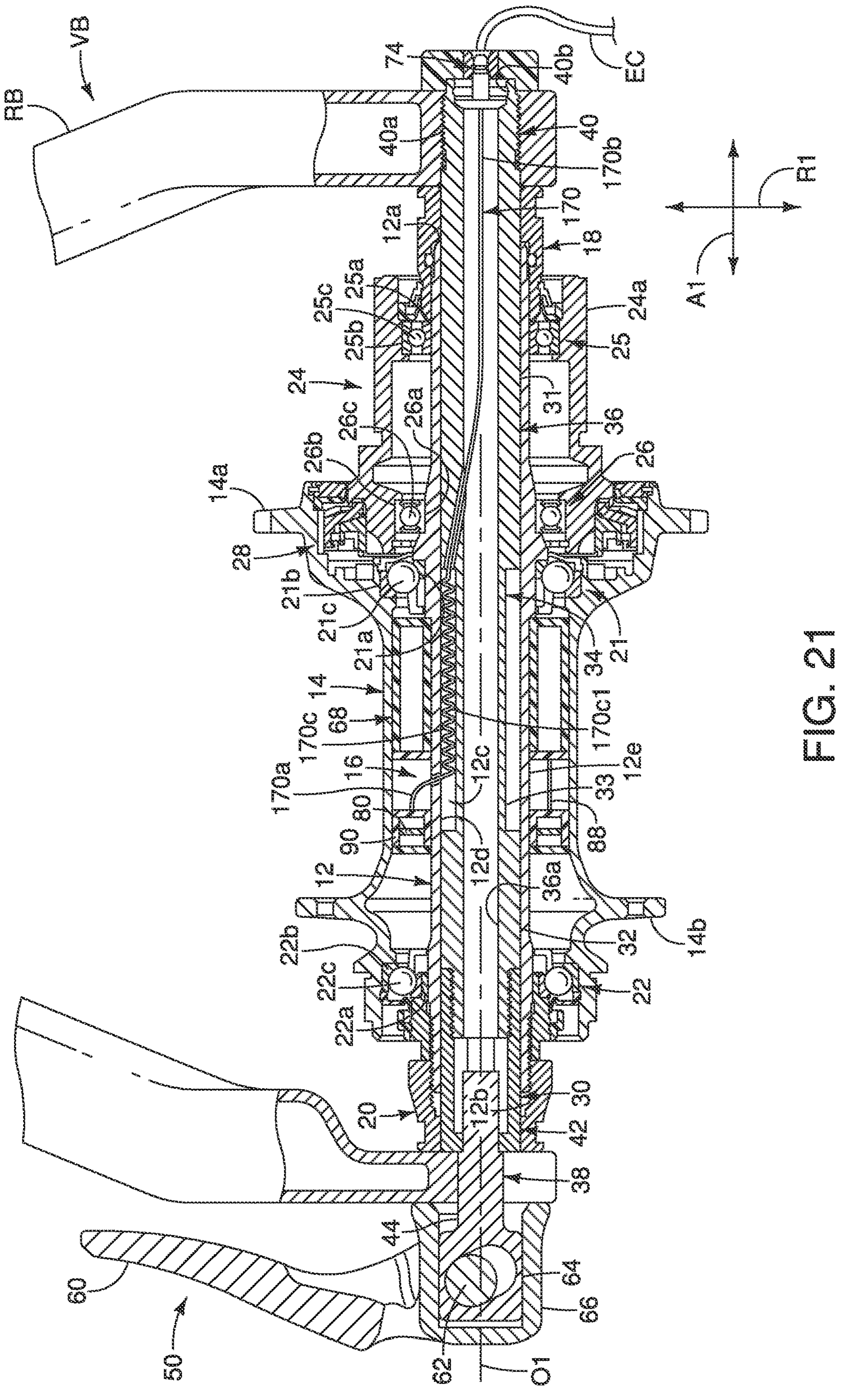
FIG. 21 is a longitudinal cross-sectional view of the hub assembly in accordance with a first modification.

Referring now to FIG. 21, a first modification of the hub assembly 10 will now be explained. In this first modification, the electrical cable 70 is replaced with an electrical cable 170. Basically, the electrical cable 170 includes a first cable section 170*a*, a second cable section 170*b* and an axially expandable cable section 170*c*. The first cable section 170*a* extends from the interior space 16 of the hub body 14 through the opening 72 in the hub axle 12 and into the through bore 12*c*. The second cable section 170*b* extends in the axial direction A1 within the through bore 12*c*. In particular, the second cable section 170*b* extends in the axial direction A1 along a section of the axial bore 36*a* along the first shaft portion 31 of the first axle part 36. The electrical connector 74 is electrically connected to an end of the second cable section 170*b* that is opposite to the axially expandable cable section 170*c*. The axially expandable cable section 170c extends between the first cable section 170a and the second cable section 170b.

In the first modification, the axially expandable cable section 170c includes an undulating section 171 that is disposed in the through bore 12c and extends in the axial direction A1. In particular, the undulating section 171 is disposed in the recessed area 34 of the first axle part 36. Here, for example, the undulating section 171 includes a flexible flat electrical cable. The undulating section 171 is expandable in the axial direction A1 by unfolding in response to movement of the thru-axle 30 relative to the hub axle 12.

Figure 22:
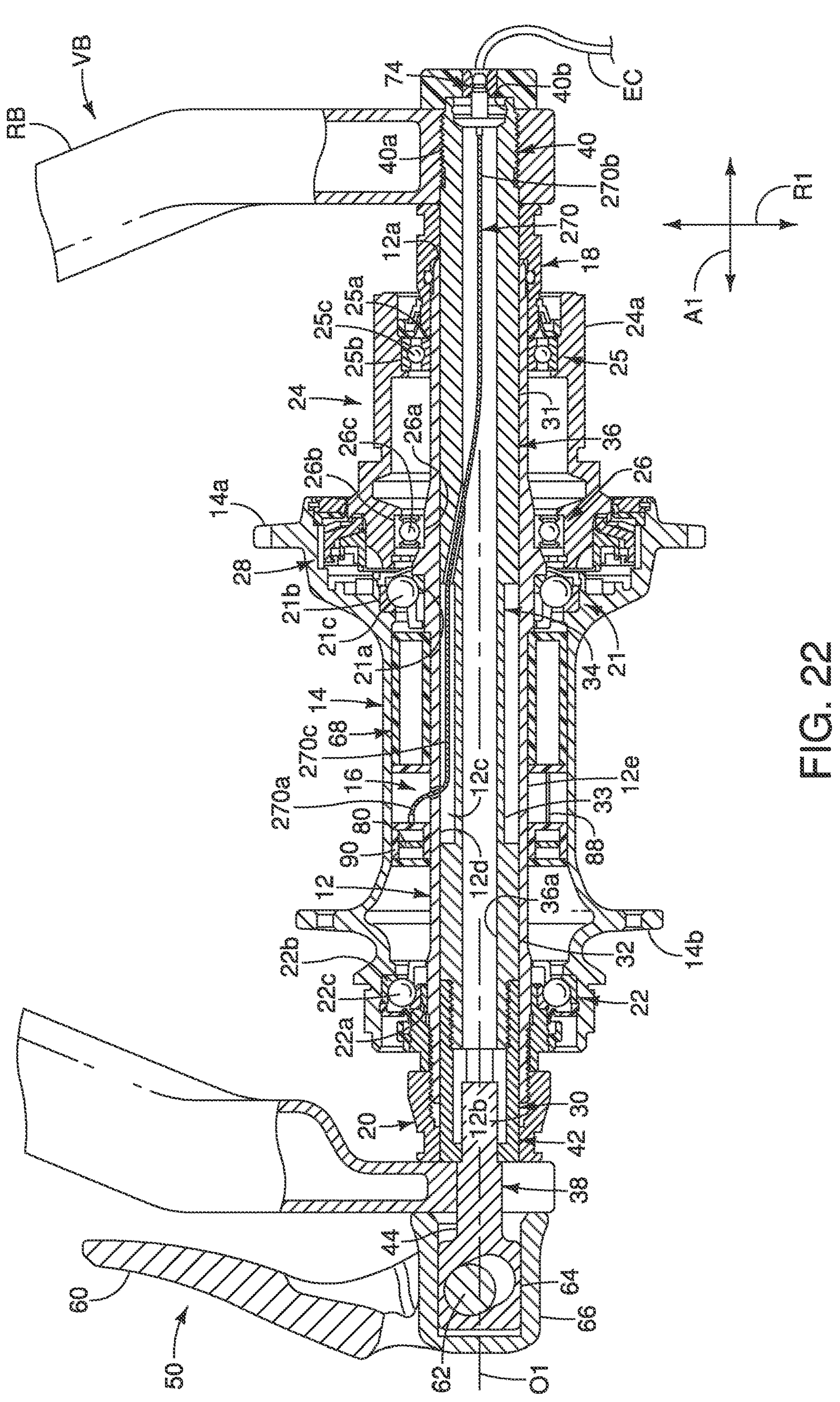
FIG. 22 is a longitudinal cross-sectional view of the hub assembly in accordance with a second modification.
Figure 23:
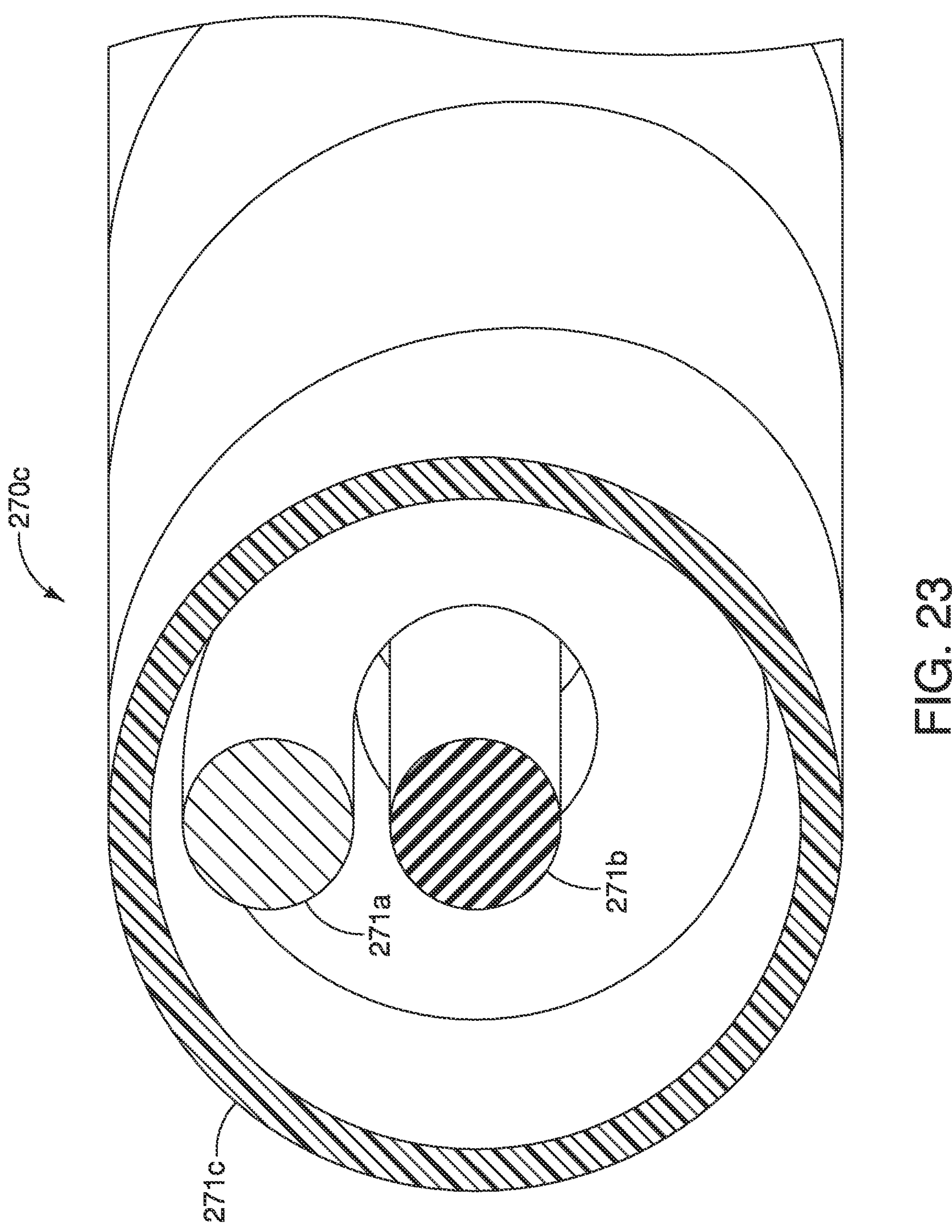
FIG. 23 is a transverse cross-sectional view of the electrical cable used in the second modification illustrated in FIG. 22.

Referring now to FIGS. 22 and 23, a second modification of the hub assembly 10 will now be explained. In this second modification, the electrical cable 70 is replaced with an electrical cable 270. Basically, the electrical cable 270 includes a first cable section 270a, a second cable section 270b and an axially expandable cable section 270c. The first cable section 270a extends from the interior space 16 of the hub body 14 through the opening 72 in the hub axle 12 and into the through bore 12c. The second cable section 270b extends in the axial direction A1 within the through bore 12c. In particular, the second cable section 270b extends in the axial direction A1 along a section of the axial bore 36a along the first shaft portion 31 of the first axle part 36. The electrical connector 74 is electrically connected to an end of the second cable section 270b that is opposite to the axially expandable cable section 270c. The axially expandable cable section 270c extends between the first cable section 270a and the second cable section 270b.

As seen in FIG. 22, the axially expandable cable section 270c includes an elastic section 271 disposed in the through bore 12c and extending in the axial direction A1. In particular, the elastic section 271 is disposed in the recessed area 34 of the thru-axle 30. More specifically, the elastic section 271 is disposed in the recessed area 34 of the first axle part 36. As seen in FIG. 23, for example, the elastic section 271 includes an electrical conductor wire 271a spirally wound around an elastic main cable 271b. The electrical conductor wire 271a is further disposed inside a flexible outer sheath 271c. In this way, the elastic section 271 is expandable in the axial direction A1 by the elastic main cable 271b stretching and the electrical conductor wire 271a uncoiling in response to movement of the thru-axle 30 relative to the hub axle 12.

Figure 24:
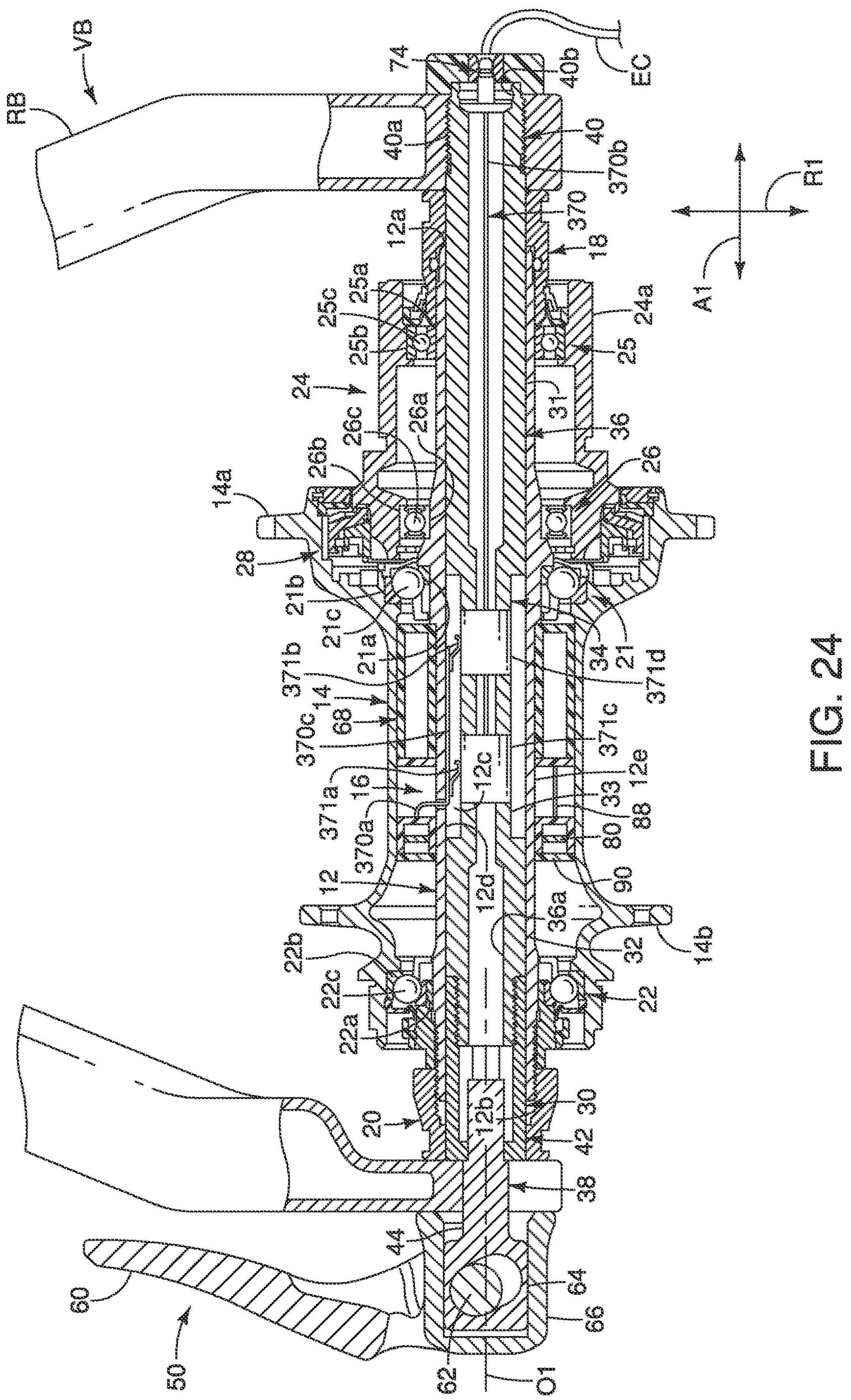
FIG. 24 is a longitudinal cross-sectional view of the hub assembly in accordance with a third modification.

Referring now to FIG. 24, a third modification of the hub assembly 10 will now be explained. In this third modification, the electrical cable 70 is replaced with an electrical cable 370. Basically, the electrical cable 370 includes a first cable section 370a and a second cable section 370b. The electrical cable 370 further includes a third cable section 370c. The first cable section 370a extends from the interior space 16 of the hub body 14 through the opening 72 in the hub axle 12 and into the through bore 12c. The second cable section 370b extends in the axial direction A1 within the through bore 12c. In particular, the second cable section 370b extends in the axial direction A1 along a section of the axial bore 36a along the first shaft portion 31 of the first axle part 36. The third cable section 370c extends between the first cable section 370a and the second cable section 370b.

The third cable section 370c has a first terminal 371a and a second terminal 371b. The first terminal 371a and the second terminal 371b are spaced apart in the axial direction A1. The first terminal 371a and the second terminal 371b are disposed in the recessed area 34 of the thru-axle 30 between the outer surface 33a of the intermediate shaft portion 33 and the inner surface 12d of the hub axle 12 that defines the through bore 12c in the radial direction R1. Here, the first terminal 371a and the second terminal 371b are disposed on the inner surface 12d of the hub axle 12 and project into the recessed area 34 of the thru-axle 30. The first cable portion 370a is electrically connected to the first terminal 371a and the second terminal 371b. In particular, the first terminal 371a and the second terminal 371b are electrically connected to the third cable section 370c, which is electrically connected to the first cable portion 370a. For example, the first cable portion 370a and the third cable section 370c are formed of a single continuous piece of electrical cable. The thru-axle 30 includes an outer surface having a first electrode 371c and a second electrode 371d. Specifically, the first axle part 36 includes an outer surface having the first electrode 371c and the second electrode 371d that are spaced apart in the axial direction A1. More specifically, the first electrode 371c and the second electrode 371d are annular metal bands. The first electrode 371c and the second electrode 371d are disposed on the intermediate shaft portion 33. The second cable portion 370b is electrically connected to the first electrode 371c and the second electrode 371d. The electrical connector 74 is electrically connected to an end of the second cable section 370b that is opposite to the first electrode 371c and the second electrode 371d.

The second electrode 371d is spaced from the first electrode 371c in the axial direction A1. The first terminal 371a is in sliding contact with the first electrode 371c and the second terminal 371b being in sliding contact with the second electrode 371d such that electrical contact is maintained between the first terminal 371a and the first electrode 371c and between the second terminal 371b and the second electrode 371d in a case where the thru-axle 30 moves in the axial direction A1.

Figure 26:
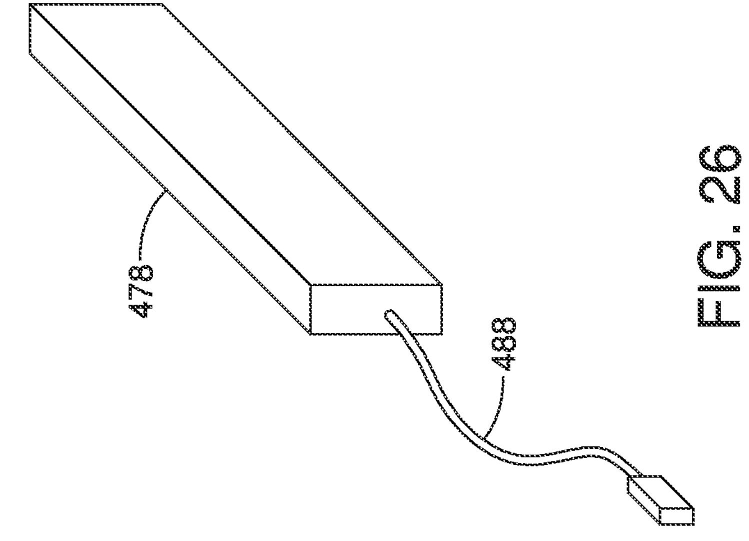
FIG. 26 is a perspective view of one of the batteries used in the fourth modification illustrated in FIG. 25.
Figure 25:
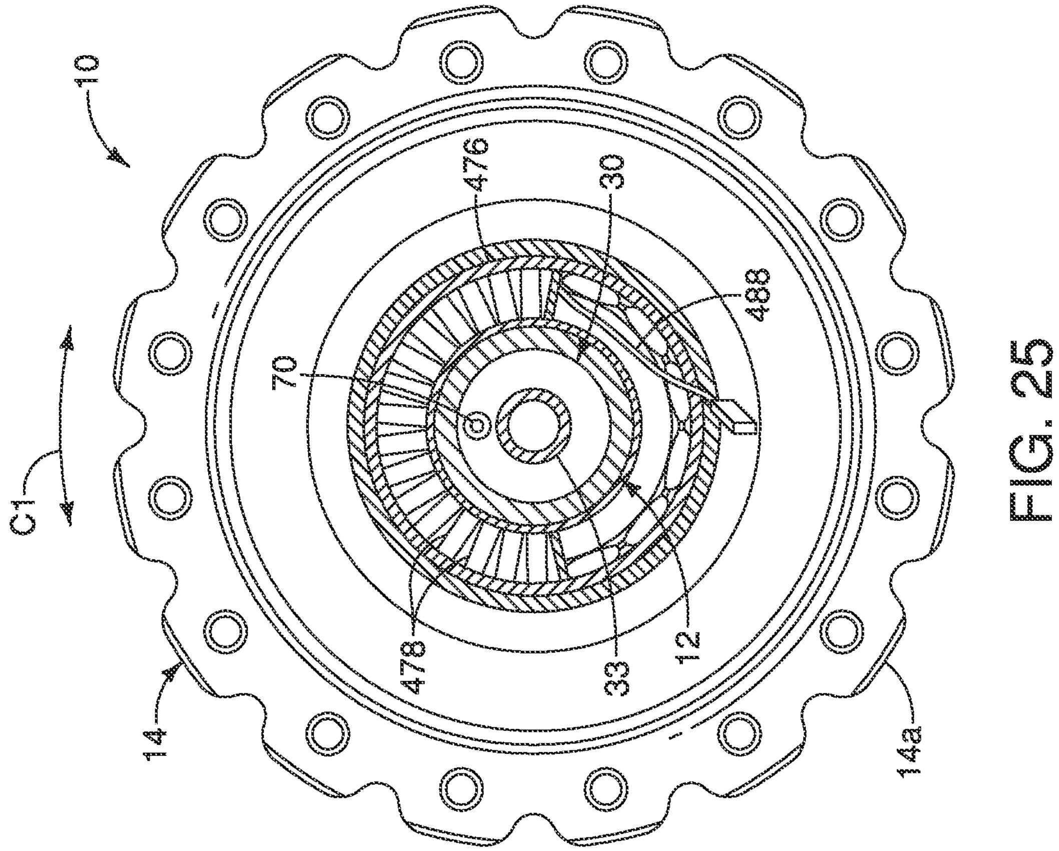
FIG. 25 is a transverse cross-sectional view of the hub assembly in accordance with a fourth modification.

Referring now to FIGS. 25 and 26, a fourth modification of the hub assembly 10 will now be explained. In this fourth modification, the casing 76 and the cylindrical shaped batteries 78 have been replaced with a casing 476 and a plurality of flat shaped batteries 478. The batteries 478 are disposed in the casing 476, which is located in the interior space 16 between the hub body 14 and the hub axle 12. Here, in the fourth modification, the casing 476 is arc-shaped. Also, in the fourth modification, each battery 478 has a flat shape and an elongated shape in the axial direction A1. The batteries 478 are electrically connected to together and disposed in the casing 476 to form a battery pack. The batteries 478 are electrically connected to the circuit board 80 by the electrically cable 488 for controlling the charging of the batteries 478 and the supply of electricity from the batteries 478 to an electric component (e.g., the electric rear derailleur RD) that is a separate component from the hub assembly 10. This fourth modification can be used with any of the prior modifications.

Figure 27:
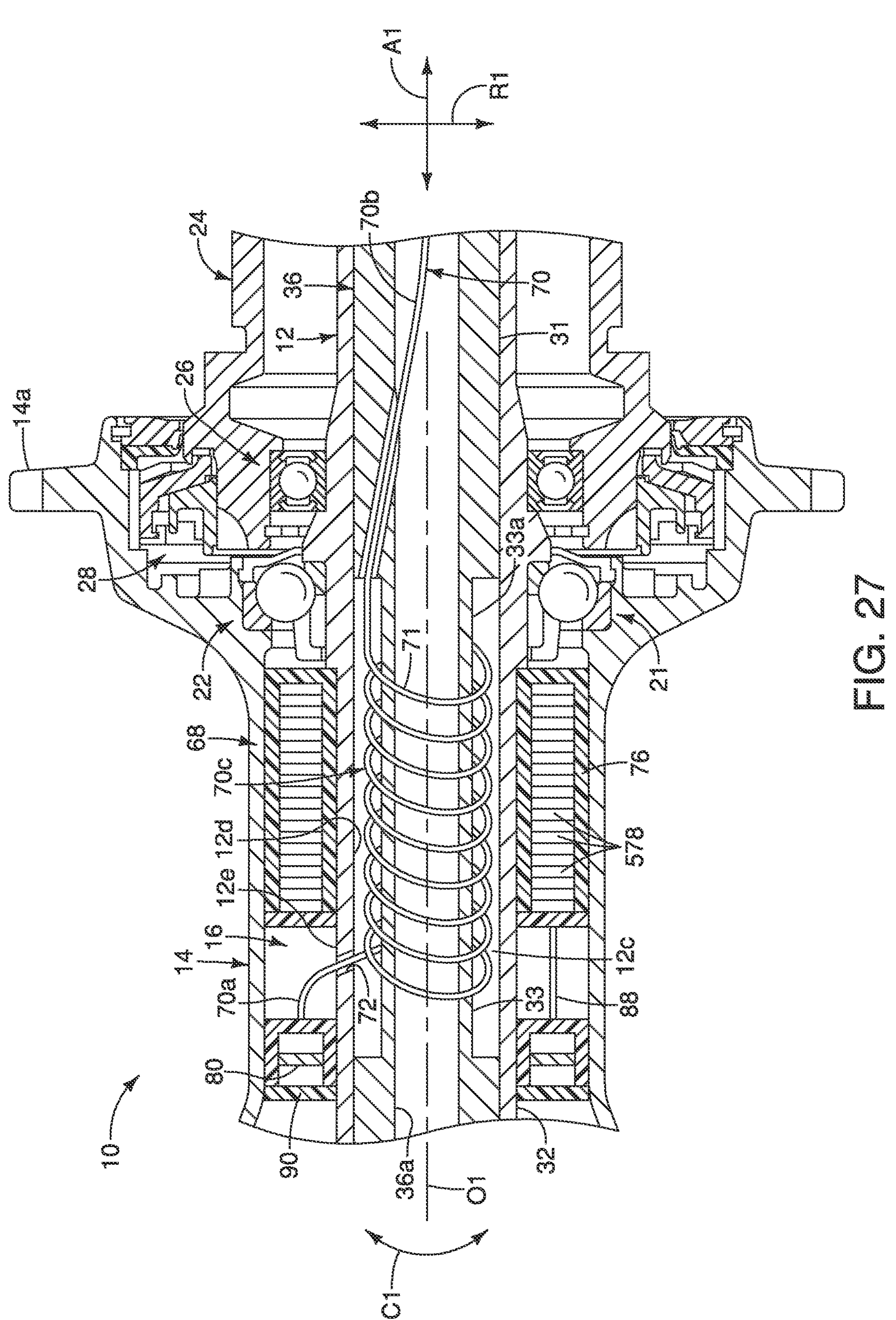
FIG. 27 is an enlarged longitudinal cross-sectional view of the middle portion of the hub assembly in accordance with a fifth modification.

Referring now to FIG. 27, a fifth modification of the hub assembly 10 will now be explained. In the fifth modification, the cylindrical shaped batteries 78 have been replaced a plurality of flat shaped batteries 578. The batteries 578 are disposed in the casing 76, which is located in the interior space 16 between the hub body 14 and the hub axle 12. Here, the fifth modification, the batteries 578 are flat batteries that are laminated in the axial direction A1. The batteries 578 can be donut shaped or arc-shaped so as to at least partially surround the outer surface 12e of the hub axle 12 in the circumferential direction C1. The batteries 578 are electrically connected to together and disposed in the casing 76 to form a battery pack. The batteries 578 are electrically connected to the circuit board 80 by the electrically cable 88 for controlling the charging of the batteries 578 and the supply of electricity from the batteries 578 to an electric component (e.g., the electric rear derailleur RD) that is a separate component from the hub assembly 10. This fifth modification can be used with any of the first to third modifications.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle (e.g., bicycle) in an upright, riding position and equipped with the hub assembly. Accordingly, these directional terms, as utilized to describe the hub assembly should be interpreted relative to a human-powered vehicle (e.g., bicycle) in an upright riding position on a horizontal surface and that is equipped with the hub assembly. The terms "left" and "right" are used to indicate the "right" when referencing from the right side as viewed from the rear of the human-powered vehicle (e.g., bicycle), and the "left" when referencing from the left side as viewed from the rear of the human-powered vehicle (e.g., bicycle).

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of". For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C. (6) both A and C, and (7) all A, B, and C. In other words, the phrase "at least one of A and B" does not mean "at least one of A and at least one of B" in this disclosure.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A hub assembly for a human powered vehicle, the hub assembly comprising:

a hub axle having a through bore and a center axis defining an axial direction and a radial direction;

a hub body rotatably disposed around the center axis and having an interior space defined between the hub body and the hub axle in the radial direction;

a thru-axle configured to be disposed in the through bore of the hub axle; and an electrical cable including a first cable section extending from the interior space of the hub body through an opening in the hub axle and into the through bore, the electrical cable including a second cable section extending in the axial direction within the through bore, the electrical cable including an axially expandable cable section between the first cable section and the second cable section, the axially expandable cable section extending in the axial direction within the through bore, and being expandable in the axial direction in response to movement of the thru-axle relative to the hub axle.

2. The hub assembly according to claim 1, wherein the axially expandable cable section includes a coiled section spirally wrapped around the thru-axle.

3. The hub assembly according to claim 1, wherein the axially expandable cable section includes an undulating section disposed in the through bore and extending in the axial direction.

4. The hub assembly according to claim 3, wherein the undulating section includes a flexible flat electrical cable.

5. The hub assembly according to claim 1, wherein the axially expandable cable section includes an elastic section disposed in the through bore and extending in the axial direction.

6. The hub assembly according to claim 5, wherein the elastic section includes an electrical conductor wire spirally wound around an elastic main cable and disposed inside a flexible outer sheath.

7. The hub assembly according to claim 1, wherein the thru-axle includes a first shaft portion, a second shaft portion and an intermediate shaft portion disposed between the first shaft portion and the second shaft portion, the intermediate shaft portion has a radial width that is smaller than a radial width of the first shaft portion and a radial width of the second shaft portion to define recessed area of the thru-axle, and the axially expandable cable section is disposed in the recessed area of the thru-axle between an outer surface of the intermediate shaft portion and an inner surface of the hub axle in the radial direction.

8. The hub assembly according to claim 7, wherein the axially expandable cable section includes a coiled section spirally wrapped around the intermediate shaft portion.

9. The hub assembly according to claim 7, wherein the axially expandable cable section includes an undulating section disposed in the recessed area of the thru-axle.

10. The hub assembly according to claim 9, wherein the undulating section includes a flexible flat electrical cable.

11. The hub assembly according to claim 7, wherein the axially expandable cable section includes an elastic section disposed in the recessed area of the thru-axle.

12. The hub assembly according to claim 11, wherein the elastic section includes an electrical conductor wire spirally wound around an elastic main cable and disposed inside a flexible outer sheath.

13. The hub assembly according to claim 8, further comprising an electrical connector coupled to an axial end of the thru-axle, and the electrical connector being electrically connected to an end of the second cable section that is opposite to the axially expandable cable section.

14. The hub assembly according to claim 13, wherein the electrical connector is at least partly disposed in a connector hole of the axial end of the thru-axle.

15. The hub assembly according to claim 14, wherein the electrical connector includes at least one electrical pin that partly projects from the axial end of the thru-axle.

16. The hub assembly according to claim 15, wherein the at least one electrical pin is configured to be rotatably disposed in a connector hole such that relative rotation between the at least one electrical pin and a first axle part is permitted.

17. A hub assembly for a human powered vehicle, the hub assembly comprising:

a hub axle having a through bore and a center axis defining an axial direction and a radial direction;

a hub body rotatably disposed around the center axis and having an interior space defined between the hub body and the hub axle in the radial direction;

a thru-axle configured to be axially disposed in the through bore of the hub axle; and an electrical cable including a first cable section extending from the interior space of the hub body through an opening in the hub axle and into the through bore, the electrical cable including a second cable section extending in the axial direction within the through bore, the electrical cable including a third cable section having a first terminal and a second terminal spaced apart from the first terminal in the axial direction, the thru-axle including an outer surface having a first electrode and a second electrode spaced from the first electrode in the axial direction, the first terminal being in sliding contact with the first electrode and the second terminal being in sliding contact with the second electrode such that electrical contact is maintained between the first terminal and the first electrode and between the second terminal and the second electrode in a case where the thru-axle moves in the axial direction.

18. The hub assembly according to claim 17, wherein the thru-axle includes a first shaft portion, a second shaft portion and an intermediate shaft portion disposed between the first shaft portion and the second shaft portion, the intermediate shaft portion has a radial width that is smaller than a radial width of the first shaft portion and a radial width of the second shaft portion to define recessed area of the thru-axle, the first electrode and the second electrode are disposed on the intermediate shaft portion, and the first terminal and the second terminal are disposed in the recessed area of the thru-axle between an outer surface of the intermediate shaft portion and an inner surface of the hub axle that defines the through bore in the radial direction.

19. The hub assembly according to claim 17, further comprising an electrical connector coupled to an axial end of the thru-axle, and the electrical connector being electrically connected to an end of the second cable section that is opposite to the first electrode and the second electrode.

20. The hub assembly according to claim 19, wherein the electrical connector is at least partly disposed in a connector hole of the axial end of the thru-axle.

21. The hub assembly according to claim 20, wherein the electrical connector includes at least one electrical pin that partly projects from the axial end of the thru-axle.

22. The hub assembly according to claim 21, wherein the at least one electrical pin is configured to be rotatably disposed in the connector hole such that relative rotation between the at least one electrical pin and a first axle part is permitted.

* * * * *